(12) United States Patent
Ono et al.

(10) Patent No.: US 11,781,231 B2
(45) Date of Patent: Oct. 10, 2023

(54) CARBON DIOXIDE ELECTROLYTIC DEVICE AND METHOD OF ELECTROLYZING CARBON DIOXIDE

(71) Applicant: KABUSHIKI KAISHA TOSHIBA, Tokyo (JP)

(72) Inventors: Akihiko Ono, Kita (JP); Yuki Kudo, Yokohama (JP); Yusuke Kofuji, Yokohama (JP); Asahi Motoshige, Ota (JP); Ryota Kitagawa, Setagaya (JP); Masakazu Yamagiwa, Yokohama (JP); Satoshi Mikoshiba, Yamato (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 23 days.

(21) Appl. No.: 17/189,432

(22) Filed: Mar. 2, 2021

(65) Prior Publication Data

US 2022/0064808 A1 Mar. 3, 2022

(30) Foreign Application Priority Data

Sep. 2, 2020 (JP) ................................. 2020-147634

(51) Int. Cl.
*C25B 9/67* (2021.01)
*C25B 1/23* (2021.01)
(Continued)

(52) U.S. Cl.
CPC .................. *C25B 9/67* (2021.01); *C25B 1/04* (2013.01); *C25B 1/23* (2021.01); *C25B 9/19* (2021.01); *C25B 15/021* (2021.01)

(58) Field of Classification Search
CPC ......... C25B 3/25–26; C25B 9/70; C25B 9/73; C25B 9/75; C25B 1/04; C25B 15/021
(Continued)

(56) References Cited

U.S. PATENT DOCUMENTS 3,917,520 A * 11/1975 Katz ....................... C25B 15/08
204/278
4,495,048 A * 1/1985 Murakami ............ C25B 11/036
204/278
(Continued)

FOREIGN PATENT DOCUMENTS

CN  108570690 A  9/2018
EP  3 325 692     5/2018
(Continued)

OTHER PUBLICATIONS

Liu, Z. et al., "Electrochemical generation of syngas from water and carbon dioxide at industrially important rates," Journal of $CO_2$ Utilization, vol. 15, 2016, 7 pages.
(Continued)

*Primary Examiner* — Harry D Wilkins, III
(74) *Attorney, Agent, or Firm* — Oblon, McClelland, Maier & Neustadt, L.L.P.

(57) ABSTRACT

A carbon dioxide electrolytic device, includes: an electrolysis cell including an anode to oxidize water and thus form oxygen, an anode flow path facing the anode, a cathode to reduce carbon dioxide and thus form a carbon compound, a cathode flow path facing the cathode, and a separator between the anode and the cathode; a cooling flow path provided opposite to the anode flow path or the cathode flow path and connected in parallel to the anode flow path; an anode inflow path connecting an inlet of the anode flow path, an inlet of the cooling flow path, and an outlet of a liquid tank to store a liquid containing water; an anode outflow path connecting an outlet of the anode flow path, an outlet of the cooling flow path, and an inlet of the liquid tank; and a cooler to cool the anode outflow path.

20 Claims, 10 Drawing Sheets

(51) Int. Cl.
*C25B 15/021* (2021.01)
*C25B 9/19* (2021.01)
*C25B 1/04* (2021.01)

(58) Field of Classification Search
USPC .................................. 205/412; 204/262, 254
See application file for complete search history.

(56) References Cited

U.S. PATENT DOCUMENTS

| | | |
|---|---|---|
| 2004/0020787 A1 | 2/2004 | Sano |
| 2004/0040862 A1* | 3/2004 | Kosek ................. C01B 13/0255 205/637 |
| 2010/0187129 A1* | 7/2010 | Sano .................... C02F 1/4618 205/746 |
| 2013/0029246 A1 | 1/2013 | Akiyama |
| 2015/0211132 A1* | 7/2015 | MacKinnon ........ H01M 8/0656 204/252 |
| 2018/0216243 A1* | 8/2018 | Kudo ....................... C25B 9/73 |
| 2018/0265440 A1 | 9/2018 | Kudo et al. |
| 2018/0274109 A1 | 9/2018 | Kudo et al. |
| 2018/0274114 A1* | 9/2018 | Ono .......................... C25B 1/00 |
| 2019/0088956 A1* | 3/2019 | Glueck ............... H01M 8/0254 |
| 2020/0002821 A1* | 1/2020 | Ono .......................... C25B 9/05 |
| 2020/0017985 A1 | 1/2020 | Yamagiwa et al. |
| 2020/0080211 A1 | 3/2020 | Schmid et al. |
| 2020/0216968 A1 | 7/2020 | Hunegnaw et al. |

FOREIGN PATENT DOCUMENTS

| | | | |
|---|---|---|---|
| EP | 3543376 A1 * | 9/2019 | ............... C25B 1/04 |
| JP | 6-260200 A | 9/1994 | |
| JP | 3337258 B2 | 10/2002 | |
| WO | WO-2011129057 A1 * | 10/2011 | ............. C25B 1/245 |
| WO | WO-2016097261 A1 * | 6/2016 | ............ B01J 19/249 |
| WO | WO 2017/014635 A1 | 1/2017 | |

OTHER PUBLICATIONS

Ma, S. et al., "Efficient Electrochemical Flow System with Improved Anode for the Conversion of $CO_2$ to CO," Journal of The Electrochemical Society, vol. 161, No. 10, 2014, 8 pages.

* cited by examiner

IN    OUT

OUT    IN

CARBON DIOXIDE ELECTROLYTIC DEVICE AND METHOD OF ELECTROLYZING CARBON DIOXIDE

CROSS-REFERENCE TO RELATED APPLICATION

This application is based upon and claims the benefit of priority from Japanese Patent Application No. 2020-147634, filed on Sep. 2, 2020; the entire contents of which are incorporated herein by reference.

FIELD

Embodiments relate to a carbon dioxide electrolytic device and a method of electrolyzing carbon dioxide.

BACKGROUND

In recent years, depletion of fossil fuel such as petroleum or coal has been concerned, and expectation for sustainably-usable renewable energy has been rising. Examples of renewable energy include a solar cell, wind power generation, and the like. Since the amount of electricity generated depends on the weather and natural conditions, there is a problem that it is difficult to ensure a stable supply of electricity. For this reason, attempts are being made to stabilize the supply of electricity by storing the electricity generated by renewable energy in storage batteries. However, when storing the electricity, there are problems such as the cost of storage batteries and the loss that occurs when the electricity is stored.

With respect to such points, some technologies use electricity generated from renewable energy to electrolyze water ($H_2O$) to produce hydrogen ($H_2$) from water or to electrochemically reduce carbon dioxide ($CO_2$) and convert it into a chemical substance (chemical energy) such as a carbon compound such as carbon monoxide (CO), formic acid (HCOOH), methanol ($CH_3OH$), methane ($CH_4$), acetic acid ($CH_3COOH$), ethanol ($C_2H_5OH$), ethane ($C_2H_6$), or ethylene ($C_2H_4$). Storage of these chemical substances in cylinders or tanks has the advantage of lower energy storage costs and less storage loss compared to storing electricity (electric energy) in storage batteries.

As a carbon dioxide electrolytic device, for example, a structure that uses a silver nanoparticle catalyst for a cathode, contacts the cathode with a cathode solution and carbon dioxide gas, and contacts an anode with an anode solution has been studied. A concrete configuration of the electrolytic device includes, for example, a configuration provided with a cathode solution flow path provided along one surface of the cathode, a carbon dioxide gas flow path provided along the other surface of the cathode, an anode solution flow path provided along one surface of the anode, and a separator provided between the cathode solution flow path and the anode solution flow path. When a reaction of producing, for example, carbon monoxide from carbon dioxide is performed for a long time by using the electrolytic device having such a configuration and, for example, by applying a constant current to the cathode and anode, there is a problem of degradation of cell performance over time, such as decrease in a production amount of carbon monoxide and increase in cell voltage. For this reason, there has been demanded a carbon dioxide electrolytic device capable of suppressing the deterioration over time of the cell performance.

DETAILED DESCRIPTION

A carbon dioxide electrolytic device, includes: an electrolysis cell including an anode configured to oxidize water and thus form oxygen, an anode flow path facing the anode, a cathode configured to reduce carbon dioxide and thus form a carbon compound, a cathode flow path facing the cathode, and a separator between the anode and the cathode; a cooling flow path provided opposite to the anode flow path or the cathode flow path and connected in parallel to the anode flow path; an anode inflow path connecting an inlet of the anode flow path, an inlet of the cooling flow path, and an outlet of a liquid tank configured to store a liquid containing water; an anode outflow path connecting an outlet of the anode flow path, an outlet of the cooling flow path, and an inlet of the liquid tank; and a cooler configured to cool the anode outflow path.

Hereinafter, a carbon dioxide electrolytic device of an embodiment will be described with reference to the drawings. In each embodiment presented below, substantially the same components are denoted by the same reference signs, and a description thereof is sometimes partially omitted. The drawings are schematic, and a relationship between a thickness and a planar size, thickness proportions of the respective portions, and the like are sometimes different from actual ones.

In this specification, "connect" includes not only direct connection but also indirect connection, unless otherwise specified.

Figure 1:
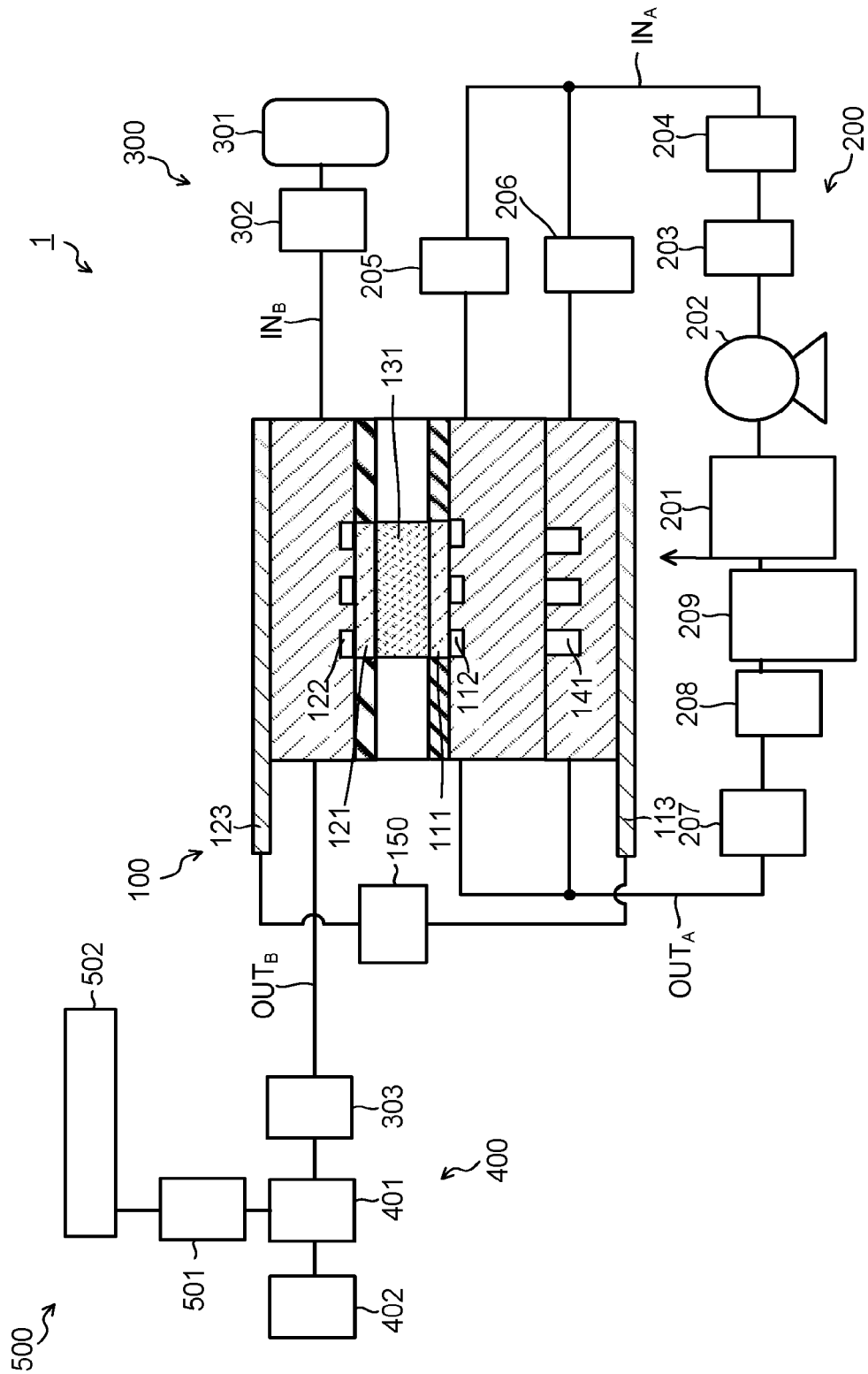
FIG. 1 is a schematic diagram to explain a configuration example of a carbon dioxide electrolytic device.

FIG. 1 is a schematic diagram to explain a configuration example of a carbon dioxide electrolytic device. A carbon dioxide electrolytic device 1 includes an electrolytic reaction unit 100, an anode supply unit 200, a cathode supply unit 300, a collection unit 400, and a control unit 500.

The electrolytic reaction unit 100 includes an anode 111, an anode flow path 112, an anode current collector 113, a cathode 121, a cathode flow path 122, a cathode current collector 123, a separator 131, and a cooling flow path 141. The anode 111, the anode flow path 112, the cathode 121, the cathode flow path 122, and the separator 131 form an electrolysis cell.

Figure 2:
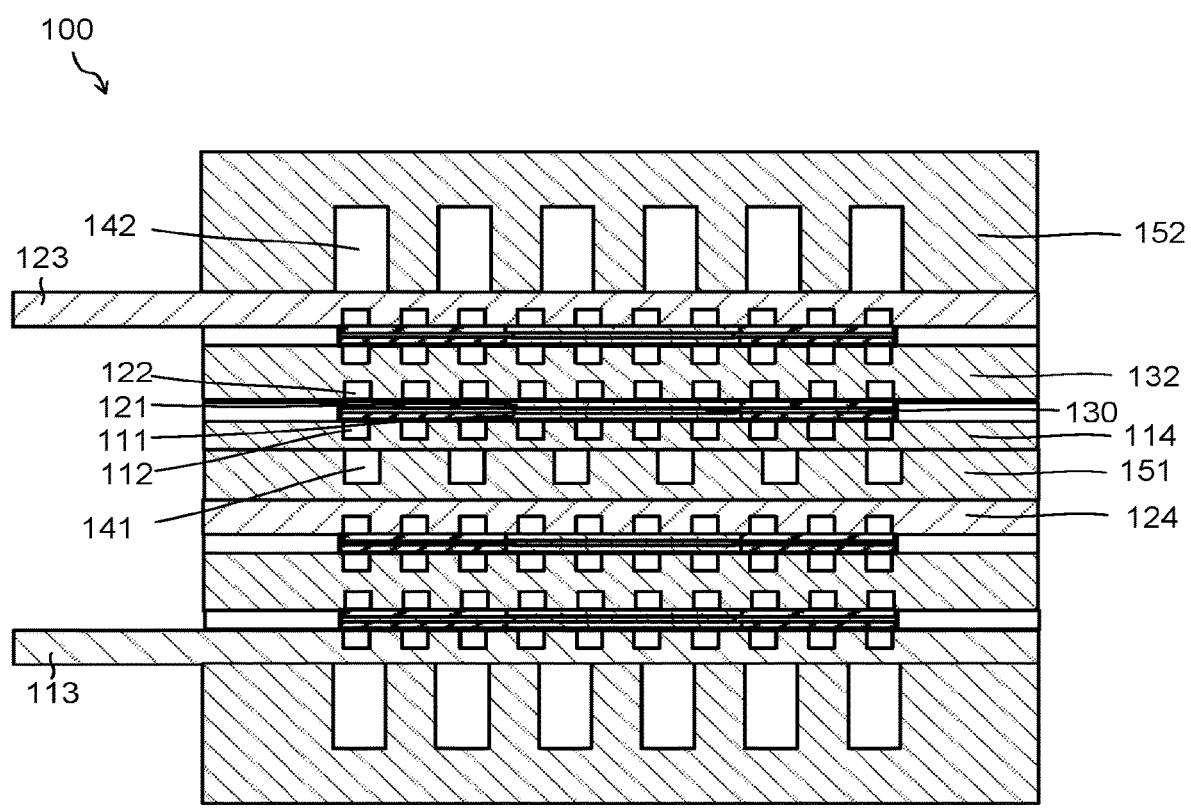
FIG. 2 is a schematic diagram to explain another structural example of an electrolytic reaction unit 100.
Figure 3:
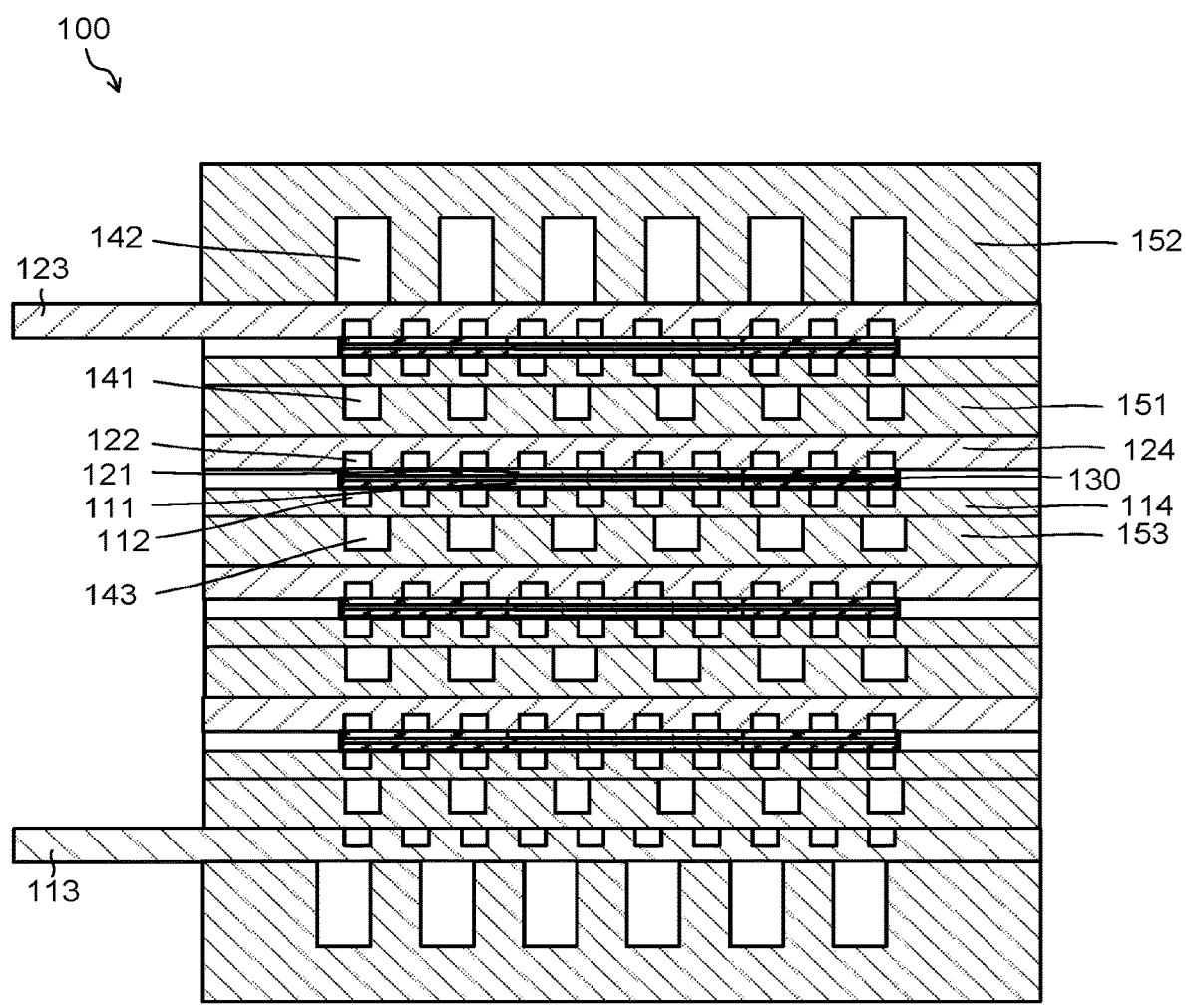
FIG. 3 is a schematic diagram to explain still another structural example of the electrolytic reaction unit 100.

FIG. 2 is a schematic diagram to explain another structural example of the electrolytic reaction unit 100. FIG. 3 is a schematic diagram to explain still another structural example of the electrolytic reaction unit 100. The electrolytic reaction unit 100 can also include a plurality of electrolysis cells, as illustrated in FIG. 2 and FIG. 3. The plurality of electrolysis cells may be sandwiched between a pair of non-illustrated support plates, for example, and further tightened with bolts or the like.

The anode 111 is in contact with the separator 131. The anode 111 is an electrode for oxidizing water to produce oxygen ($O_2$) and hydrogen ions ($H^+$), or for oxidizing hydroxide ions ($OH^-$) produced by a reduction reaction of carbon dioxide at the cathode 121 to produce oxygen and water.

The anode 111 preferably contains a catalyst material (anode catalyst material) capable of reducing an overvoltage in the above oxidation reaction. Such catalyst materials include, for example, metals such as platinum (Pt), palladium (Pd), and nickel (Ni), alloys and intermetallic compounds containing those metals, binary metal oxides such as manganese oxide (Mn—O), iridium oxide (Ir—O), nickel oxide (Ni—O), cobalt oxide (Co—O), iron oxide (Fe—O), tin oxide (Sn—O), indium oxide (In—O), ruthenium oxide (Ru—O), lithium oxide (Li—O), or lanthanum oxide (La—O), ternary metal oxides such as Ni—Co—O, Ni—Fe—O, La—Co—O, Ni—La—O, or Sr—Fe—O, quaternary metal oxides such as Pb—Ru—Ir—O or La—Sr—Co—O, and metal complexes such as a Ru complex and a Fe complex.

The anode 111 includes a base material having a structure capable of making a liquid or ions move between the separator 131 and the anode flow path 112, for example, a porous structure such as a mesh material, a punching material, a porous body, or a metal fiber sintered body. The base material may be formed of a metal such as titanium (Ti), nickel (Ni), or iron (Fe), or a metal material such as an alloy (for example, SUS) containing at least one of these metals, or may be formed of the above-described anode catalyst material. When an oxide is used as the anode catalyst material, it is preferable to form a catalyst layer in a manner that the anode catalyst material is adhered to or stacked on a surface of the base material made of the above-described metal material. The anode catalyst material preferably has nanoparticles, a nanostructure, a nanowire, or the like for increasing the oxidation reaction. The nanostructure is a structure in which nanoscale irregularities are formed on a surface of the catalyst material.

The cathode 121 is in contact with the separator 131. The cathode 121 is an electrode (reduction electrode) that causes a reduction reaction of carbon dioxide or a reduction reaction of carbon compounds to produce carbon compounds. Examples of the carbon compounds include carbon monoxide, formic acid (HCOOH), ethane, ethylene, methanol, acetic acid ($CH_3COOH$), ethanol, propanol ($C_3H_7OH$), and ethylene glycol ($C_2H_6O_2$). The reduction reaction at the cathode 121 may include a side reaction that causes a water reduction reaction to produce hydrogen ($H_2$), along with the reduction reaction of carbon dioxide.

The cathode 121 has a gas diffusion layer and a cathode catalyst layer provided on the gas diffusion layer. A porous layer denser than the gas diffusion layer may be provided between the gas diffusion layer and the cathode catalyst layer. The gas diffusion layer is provided on the cathode flow path 122 side, and the cathode catalyst layer is provided on the separator 131 side. The cathode catalyst layer may enter the gas diffusion layer. The cathode catalyst layer preferably has catalyst nanoparticles, a catalyst nanostructure, or the like. The gas diffusion layer is formed of, for example, carbon paper, carbon cloth, or the like, and may be subjected to a water repellent treatment. The porous layer is formed of a porous body with a smaller pore size than the carbon paper or the carbon cloth.

By applying a moderate water repellent treatment to the gas diffusion layer, carbon dioxide gas reaches the cathode catalyst layer mainly by gas diffusion. The reduction reaction of carbon dioxide and the reduction reaction of the resulting carbon compounds occur near a boundary between the gas diffusion layer and the cathode catalyst layer or near the cathode catalyst layer that has entered the gas diffusion layer.

The cathode catalyst layer is preferably formed of a catalyst material (cathode catalyst material) capable of reducing an overvoltage in the above reduction reaction. Examples of such materials include metals such as gold (Au), silver (Ag), copper (Cu), platinum (Pt), palladium (Pd), nickel (Ni), cobalt (Co), iron (Fe), manganese (Mn), titanium (Ti), cadmium (Cd), zinc (Zn), indium (In), gallium (Ga), lead (Pb), and tin (Sn), metal materials such as alloys or intermetallic compounds containing at least one of the above metals, carbon materials such as carbon (C), graphene, CNT (carbon nanotube), fullerene, or ketjen black, and metal complexes such as a Ru complex and a Re complex. The cathode catalyst layer can employ various shapes such as a plate shape, a mesh shape, a wire shape, a particle shape, a porous shape, a thin film shape, and an island shape.

The cathode catalyst material forming the cathode catalyst layer preferably has nanoparticles of the above-described metal material, a nanostructure of the metal material, a nanowire of the metal material, or a composite body in which the nanoparticles of the above-described metal material are supported on a carbon material such as carbon particles, a carbon nanotube, or graphene. By applying catalyst nanoparticles, a catalyst nanostructure, a catalyst nanowire, a catalyst nano-support structure, or the like as the cathode catalyst material, it is possible to increase reaction efficiency of the reduction reaction of carbon dioxide in the cathode 121.

The anode 111 and the cathode 121 can be connected to a power source 150.

Examples of the power source 150 are not limited to ordinary system power sources or batteries but may include a power source that provides power generated by renewable energy such as solar cells or wind power generation. The power source 150 may further have a power controller that controls a voltage between the anode 111 and the cathode 121 by adjusting output of the above power source. The power supply 150 may be provided outside the carbon dioxide electrolytic device 1.

The anode flow path 112 faces the anode 111. The anode flow path 112 has a function to supply an anode liquid to the anode 111.

The anode liquid preferably contains at least water ($H_2O$). The liquid may or may not contain carbon dioxide ($CO_2$) because carbon dioxide ($CO_2$) is supplied from the cathode flow path 122.

The anode liquid may be an electrolytic solution containing an electrolyte. The electrolytic solution may include an aqueous solution containing at least one selected from, for example, hydroxide ions ($OH^-$), hydrogen ions ($H^+$), potassium ions ($K^+$), sodium ions ($Na^+$), lithium ions ($Li^+$), chloride ions ($Cl^-$), bromide ions ($Br^-$), iodide ions ($I^-$), nitrate ions ($NO_3^-$), sulfate ions ($SO_4^{2-}$), phosphate ions ($PO_4^{2-}$), borate ions ($BO_3^{3-}$), and hydrogen carbonate ions ($HCO_3^-$). To reduce electrical resistance of the electrolytic solution, it is preferable to use an alkaline solution where an electrolyte such as potassium hydroxide or sodium hydroxide is dissolved in high concentration as the liquid.

The anode flow path 112 is provided on a surface of a flow path plate 114 as illustrated in FIG. 2 and FIG. 3. A material of the flow path plate 114 includes, for example, a material with low chemical reactivity and no conductivity. Examples of such materials include insulating resin materials such as, for example, an acrylic resin, polyether ether ketone (PEEK), and a fluorocarbon resin. The flow path plate 114 has non-illustrated screw holes for tightening.

The anode current collector 113 is electrically connected to the anode 111 of the electrolysis cell at an end portion. The anode current collector 113 preferably includes a material with low chemical reactivity and high conductivity. Such materials include metal materials such as Ti and SUS, carbon, and so on.

The cathode flow path 122 faces the cathode 121. The cathode flow path 122 has a function to supply gas, containing carbon dioxide, to the cathode 121.

The cathode flow path 122 is provided on a surface of a flow path plate 124 as illustrated in FIG. 2 and FIG. 3. A material of the flow path plate 124 is preferably a material with low chemical reactivity and high conductivity. Examples of such materials include, for example, metal materials such as Ti and SUS, carbon, and so on. The flow path plate 124 has a non-illustrated inlet and outlet of the cathode flow path 122, as well as screw holes for tightening. A packing, which is not illustrated, is sandwiched between the front and back of each flow path plate as necessary. The cathode flow path 122 may be provided at the cathode current collector 123.

The cathode current collector 123 is electrically connected to the cathode 121 of the electrolysis cell at an end portion. The cathode current collector 123 preferably includes a material with low chemical reactivity and high conductivity. Such materials include metal materials such as Ti and SUS, carbon, and so on.

The anode flow path 112 and the cathode flow path 122 can also be provided on both sides of a flow path plate 132, as illustrated in FIG. 2. A flow path plate with flow paths on both sides is also called a bipolar flow path plate.

Figure 4:
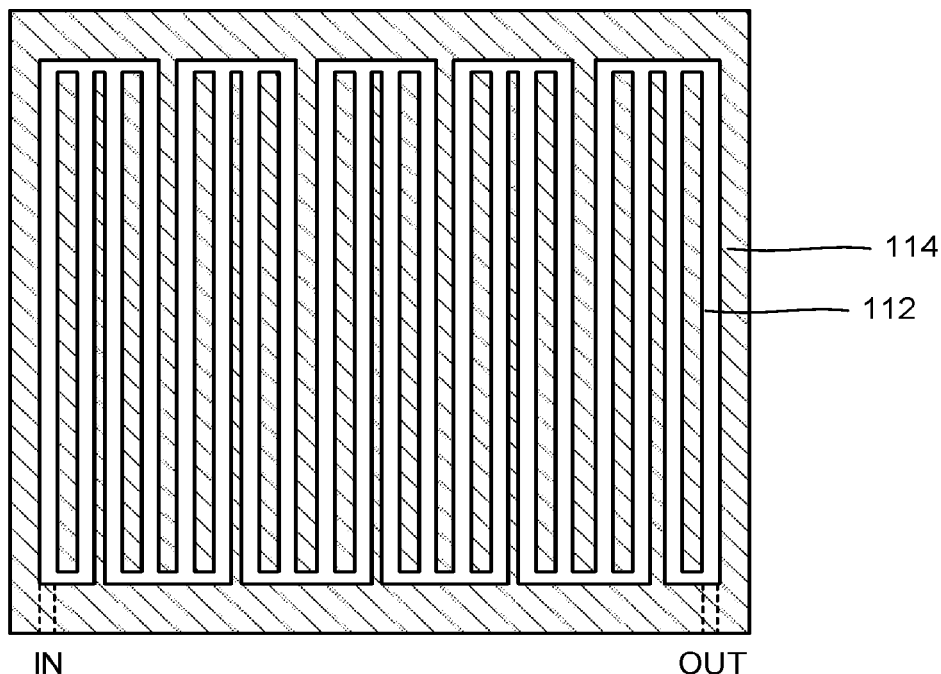
FIG. 4 is a schematic diagram illustrating a planar structural example of a flow path plate 114 with an anode flow path 112.

FIG. 4 is a schematic diagram illustrating a planar structural example of the flow path plate 114 with the anode flow path 112. The anode flow path 112 has an inlet IN and an outlet OUT provided on the flow path plate 114. The anode flow path 112 has a serpentine shape on the surface of the flow path plate 114, and a region between a folded portions is branched. The above shape allows the above liquid to be efficiently supplied to the anode flow path 112. Similar to the anode flow path 112, the cathode flow path 122 may also have the serpentine shape as illustrated in FIG. 4.

The separator 131 includes an ion exchange membrane capable of moving ions between the anode 111 and the cathode 121 and separating the anode 111 and the cathode 121. Examples of the ion exchange membranes include, for example, cation exchange membranes such as Nafion and Flemmion, and anion exchange membranes such as Neosepta and Selemion. In addition to the ion exchange membranes, glass filters, porous polymer membranes, porous insulating materials, and the like may be applied to the separator 131 as long as the material is capable of moving ions between the anode 111 and the cathode 121.

The cooling flow path 141 is connected in parallel to the anode flow path 112. The cooling flow path 141 is provided, for example, opposite to the anode flow path 112 or the cathode flow path 122. For example, the cooling flow path 141 may be provided opposite the anode 111 with respect to the anode flow path 112. The cooling flow path 141 may also be provided opposite the cathode 121 with respect to the cathode flow path 122.

Figure 5:
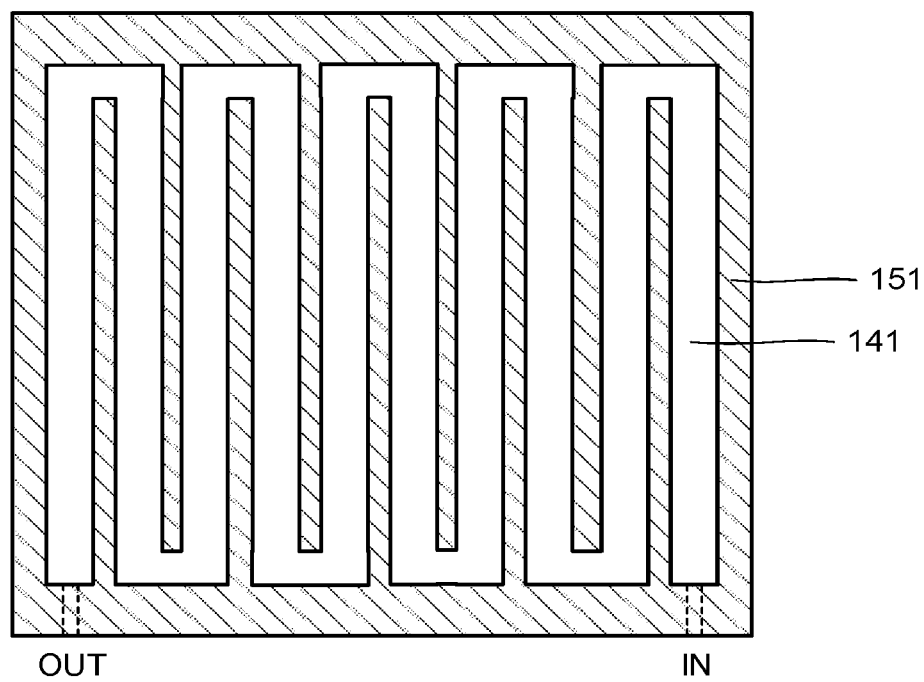
FIG. 5 is a schematic diagram illustrating a planar structural example of a flow path plate with a cooling flow path 141.

FIG. 5 is a schematic diagram illustrating a planar structural example of a flow path plate with the cooling flow path 141. The cooling flow path 141 has an inlet IN and an outlet OUT provided on a flow path plate 151. The inlet IN of the cooling flow path 141 is closer to the outlet OUT of the anode flow path 112 than the inlet IN of the anode flow path 112, and the outlet OUT of the cooling flow path 141 is closer to the inlet IN of the anode flow path 112 than the outlet OUT of the anode flow path 112. This allows, for example, the flow of the liquid in the anode flow path 112 and the flow of the anode liquid in the cooling flow path 141 to be opposite. During electrolysis operation, the anode liquid flows into an inside of the electrolysis cell from the inlet IN of the anode flow path 112, temperature rises inside the electrolysis cell, and temperature rises at the outlet OUT of the anode flow path 112, where the anode liquid flows out of the electrolysis cell so that even inside the electrolysis cell, the temperature near the inlet is low and the temperature near the outlet is high. In contrast, the temperature uniformity of the electrolysis cell can be increased by providing the inlet IN of the cooling flow path 141 on the outlet OUT side of the anode flow path 112.

The cooling flow path 141 has a serpentine shape on a surface of the flow path plate 151. The shape allows an efficient supply of liquid containing water to the cooling flow path 141. Cooling efficiency can be increased by making a flow path width of the cooling flow path 141 wider than a flow path width of the anode flow path 112.

Figure 6:
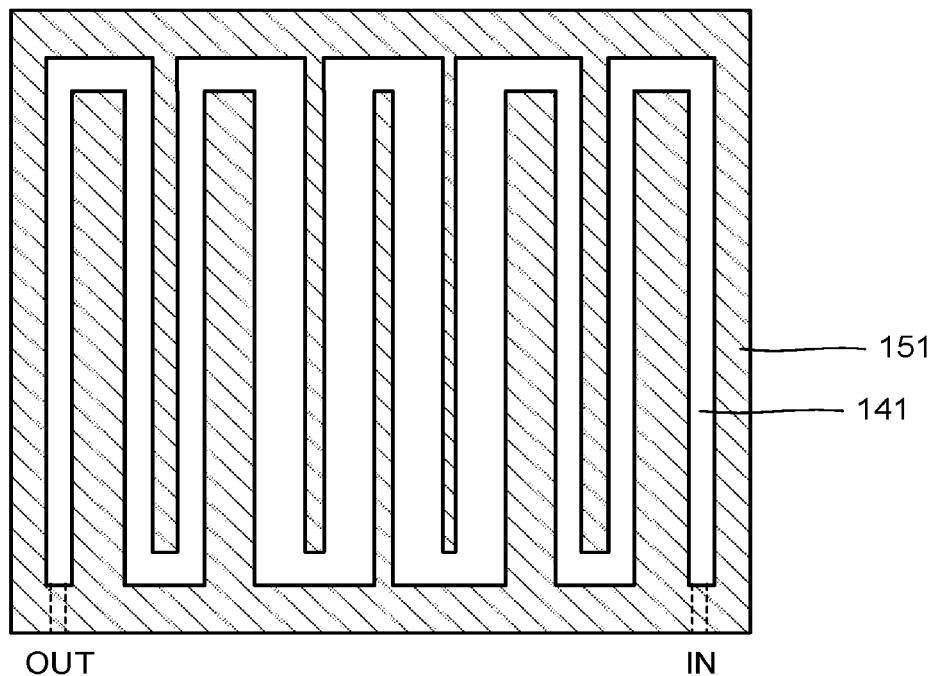
FIG. 6 is a schematic diagram illustrating another planar structural example of a flow path plate 151 with the cooling flow path 141.

FIG. 6 is a schematic diagram illustrating another planar structural example of the flow path plate 151 with the cooling flow path 141. The cooling flow path 141 illustrated in FIG. 6 differs from the cooling flow path 141 illustrated in FIG. 5 in that the cooling flow path 141 has different flow path widths between a center portion and an end portion of the cooling flow path 141. The flow path width of the cooling flow path 141 at the center portion is preferably wider than the flow path width of the cooling fl ow path 141 at the end portion. This can increase the cooling efficiency. The center portion of the electrolysis cell tends to become high temperature because there is less heat release, while the temperature of a peripheral portion of the electrolysis cell tends to decrease.

Figure 7:
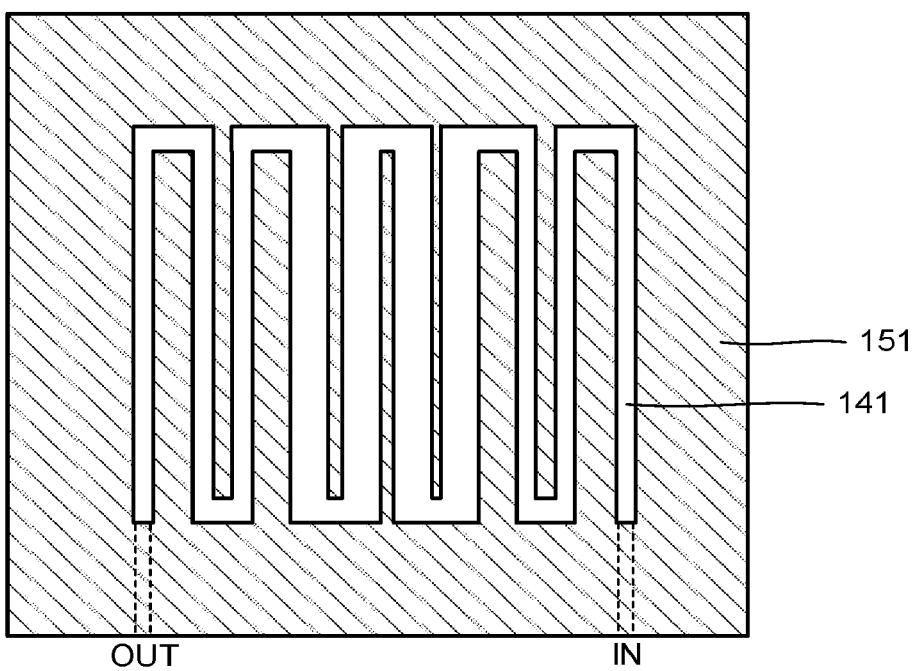
FIG. 7 is a schematic diagram illustrating still another planar structural example of the flow path plate 151 with the cooling flow path 141.

FIG. 7 is a schematic diagram illustrating another planar structural example of the flow path plate 151 with the cooling flow path 141. The cooling flow path 141 illustrated in FIG. 7 differs from the cooling flow path 141 illustrated in FIG. 5 in that the cooling flow path 141 is provided at a center portion of a surface of the flow path plate 151 and the cooling flow path 141 is not provided in a peripheral portion surrounding the center portion. Furthermore, the flow path width of the cooling flow path 141 at the center portion is preferably wider than the flow path width of the cooling flow path 141 at the end portion. This can reduce an in-plane temperature distribution of the electrolysis cell.

The electrolytic reaction unit 100 may have a plurality of cooling flow paths. The electrolytic reaction unit 100 illustrated in FIG. 2 has the cooling flow path 141 and a cooling flow path 142. The electrolytic reaction unit 100 illustrated in FIG. 3 has the cooling flow path 141, the cooling flow path 142, and a cooling flow path 143. Without being limited to the above, the electrolytic reaction unit 100 can also have at least one of the cooling flow path 141, the cooling flow path 142, and the cooling flow path 143. The description of the cooling flow path 141 can be used as descriptions of the cooling flow path 142 and the cooling flow path 143 as appropriate.

The cooling flow path 141 is provided on the surface of the flow path plate 151. The cooling flow path 142 is provided on a surface of a flow path plate 152. The cooling flow path 141 is provided between the anode 111 of one of the plurality of electrolysis cells and the cathode 121 of the other one of the plurality of electrolysis cells. The cooling flow path 142 is farther from a central electrolysis cell of the electrolytic reaction unit 100 than the cooling flow path 141. The cooling flow path 142 may be adjacent to, for example, the anode current collector 113 and provided opposite the anode 111 with respect to the anode current collector 113, and face the anode current collector 113. The cooling flow path 142 may be adjacent to the cathode current collector 123, provided opposite the cathode 121 with respect to, for example, the cathode current collector 123, and face the cathode current collector 123.

The cooling flow path 143 is provided on a surface of a flow path plate 153. The cooling flow path 143 is provided between the anode 111 of one of the plurality of electrolysis cells and the cathode 121 of the other one of the plurality of electrolysis cells. The cooling flow path 143 is closer to the central electrolysis cell of the electrolytic reaction unit 100 than the cooling flow path 141. For example, the electrolysis cell at the end portion of a stack tends to have lower cell temperature because of greater heat release from a clamping plate, whereas the electrolysis cell at the center portion of the stack tends to be high temperature. Therefore, by making a flow path width of the cooling flow path 143 facing the central electrolysis cell larger than the flow path width of the cooling flow path 141, temperature variation of the plurality of electrolysis cells can be controlled. The temperature variation of the plurality of electrolysis cells may also be controlled by making a flow path depth of the cooling flow path 143 larger than a flow path depth of the cooling flow path 141.

Examples of materials for the flow path plate 132, the flow path plate 151 to the flow path plate 153 include materials applicable to the flow path plate 114, and materials applicable to the flow path plate 124, for example.

The anode supply unit 200 has a liquid tank 201, a flow rate controller 202, a concentration sensor 203, a reference electrode 204, a flow rate controller 205, and a flow rate controller 206. The configuration of the anode supply unit 200 is not limited thereto.

The liquid tank 201 can store the anode liquid. The anode liquid contains water or a cooled water. The anode liquid may be an electrolytic solution containing, for example, an electrolyte. The liquid tank 201 may have a cooler to cool the anode liquid. This allows the temperature of the anode liquid to be controlled to, for example, 0° C. or less, thereby increasing cooling efficiency.

The liquid tank 201 is connected to a non-illustrated gas component collection unit, which collects gas components such as oxygen in the anode liquid. The anode liquid is introduced into the anode flow path 112 with a flow rate and pressure controlled at a pressure controller 207 and the flow rate controller 202.

The flow rate controller 202 has a pump, for example, and can control the flow rate of the anode liquid. The concentration sensor 203 can acquire data indicating a concentration of at least one type of ion in the anode liquid. The reference electrode 204 is provided to measure a voltage difference in voltages (cell voltages) between the anode 111 and the cathode 121.

The inlet IN of the anode flow path 112, the inlet IN of the cooling flow path such as the cooling flow path 141, and an outlet OUT of the liquid tank 201 are connected by an anode inflow path $IN_A$. The outlet OUT of the anode flow path 112, the outlet OUT of the cooling flow path such as the cooling flow path 141, and an inlet IN of the liquid tank 201 are connected by an anode outflow path $OUT_A$.

The anode inflow path $IN_A$ and the anode outflow path $OUT_A$ are formed, for example, by piping.

The flow rate controller 205 is provided in a middle of the anode inflow path $IN_A$. The flow rate controller 205 has a pump, for example, to control the flow rate of the anode liquid flowing into the anode flow path 112.

The flow rate controller 206 is provided in a middle of the anode inflow path $IN_A$. The flow rate controller 206 has a pump, for example, to control the flow rate of the anode liquid flowing into the cooling flow path such as the cooling flow path 141.

The pressure controller 207 controls a pressure inside the anode outflow path $OUT_A$. The cooler 208 can cool the inside of the anode outflow path $OUT_A$. The cooler 208 may be a heat exchanger. A solution separator 209 separates the anode liquid.

The cathode supply unit 300 has a gas tank 301, a flow rate controller 302, and a pressure controller 303. The gas tank 301 can store gas containing carbon dioxide. The flow rate controller 302 has a pump, for example, and can control a flow rate of the gas. The pressure controller 303 can control a pressure inside a cathode outflow path $OUT_B$.

An inlet of the cathode flow path 122 and an outlet of the gas tank 301 are connected by a cathode inflow path $IN_B$. An outlet of the cathode flow path 122 and the collection unit 400 are connected by the cathode outflow path $OUT_B$. The cathode inflow path $IN_B$ and the cathode outflow path $OUT_B$ are formed, for example, by piping.

The collection unit 400 has a gas-liquid separator 401 and a product collector 402. The gas-liquid separator 401 separates gas such as carbon monoxide or hydrogen from a fluid flowing out of the outlet OUT of the cathode flow path 122 and sends the gas to the product collector 402.

The control unit 500 has a cell performance detector 501 and a controller 502. The cell performance detector 501 detects a production amount of products such as carbon monoxide and hydrogen in reduction products and a production ratio and sends the detection data to the controller 502. The controller 502 receives electrical data such as a cell voltage, cell current, cathode potential, and anode potential of each electrolysis cell, as well as data such as a pressure and pressure loss inside the anode flow path 112 and the cathode flow path 122, and controls an electrolysis operation based on such data.

The controller 502 is electrically connected to, for example, the power source 150, the flow rate controller 202, the flow rate controller 205, the flow rate controller 206, the pressure controller 207, the flow rate controller 302, and the pressure controller 303 through bi-directional signal lines, which are not partially illustrated, and they are collectively controlled. Each pipe is provided with a non-illustrated valve, and an opening and closing operation of the valve is controlled by signals from the controller 502.

Next, an example of a method of electrolyzing carbon dioxide using the carbon dioxide electrolytic device will be described. In the example of the method of electrolyzing carbon dioxide, the flow rate controller 202, the flow rate controller 205, the flow rate controller 206, and the pressure controller 207 are controlled to supply the anode liquid from the liquid tank 201 to the anode flow path 112 and the cooling flow path such as the cooling flow path 141 through the anode inflow path $IN_A$, and the flow rate controller 302 and the pressure controller 303 are controlled to supply gaseous carbon dioxide from the gas tank 301 to the cathode flow path 122 through the cathode inflow path $IN_B$ and applies a voltage between the anode current collector 113 and the cathode current collector 123 from the power source 150 to apply a voltage between the anode 111 and the cathode 121 of each electrolysis cell to supply current.

When the current is applied between the anode 111 and the cathode 121, the following oxidation reaction near the anode 111 and reduction reaction near the cathode 121 occur. Here, the case of carbon monoxide (CO) formation as the carbon compound will be primarily described, but the carbon compound as the carbon dioxide reduction product is not limited to carbon monoxide and can be other carbon compounds such as the organic compounds described above. A reaction process by the electrolysis cell may be mainly to produce hydrogen ions ($H^+$) or mainly to produce hydroxide ions ($OH^-$), but is not limited to either of these reaction processes.

The reaction process in the case of mainly oxidizing water ($H_2O$) to produce hydrogen ions ($H^+$) is described. When the current is supplied between the anode 111 and the cathode 121, the oxidation reaction of water ($H_2O$) occurs in the anode 111 which is brought into contact with the anode liquid flowing through the anode flow path 112. Concretely, as presented in the following formula (1), $H_2O$ contained in the anode liquid is oxidized to produce oxygen ($O_2$) and hydrogen ions ($H^+$).

$$2H_2O \rightarrow 4H^+ + O_2 + 4e^- \qquad (1)$$

$H^+$ produced in the anode 111 moves in a cathode solution in the cathode flow path 122 through the anode 111 and the separator 131, and reaches the vicinity of the cathode 121. The reduction reaction of carbon dioxide ($CO_2$) is caused by electrons ($e^-$) based on the current supplied from the power source 150 to the cathode 121 and $H^+$ moved to the vicinity of the cathode 121. Concretely, as presented in the following formula (2), $CO_2$ supplied from the cathode flow path 122 to the cathode 121 is reduced to produce CO.

$$2CO_2 + 4H^+ + 4e^- \rightarrow 2CO + 2H_2O \qquad (2)$$

Next, the reaction process in the case of mainly reducing carbon dioxide ($CO_2$) to produce hydroxide ions ($OH^-$) is described. When the current is supplied between the anode 111 and the cathode 121, in the vicinity of the cathode 121, water ($H_2O$) and carbon dioxide ($CO_2$) are reduced to produce carbon monoxide (CO) and hydroxide ions ($OH^-$), as presented in the following formula (3). The hydroxide ions ($OH^-$) diffuse to the vicinity of the anode 111, and as presented in the following formula (4), the hydroxide ions ($OH^-$) are oxidized to produce oxygen ($O_2$).

$$2CO_2 + 2H_2O + 4e^- \rightarrow 2CO + 4OH^- \qquad (3)$$

$$4OH^- \rightarrow 2H_2O + O_2 + 4e^- \qquad (4)$$

The anode liquid contained in the fluid flowing out of the anode flow path 112 is cooled by the cooler 208 through the anode outflow path $OUT_A$ and flows into the liquid tank 201. By circulating the anode liquid in this way, the anode liquid can be used efficiently.

A part of the anode liquid flowing into the anode flow path 112 may flow into the cathode flow path 122 through the anode 111, the separator 131, and the cathode 121. In contrast, the fluid flowing out of the cathode flow path 122 is sent to the gas-liquid separator 401 through the cathode outflow path $OUT_B$ to separate gas containing reduction products from the fluid and is collected by the product collector 402.

The controller 502 may perform a cooling operation when a cell output of the electrolysis cell during electrolysis does not meet required criteria. The required criteria for the cell output are set, for example, from a relationship between the cell output and temperature of the electrolysis cell. As the temperature of the electrolysis cell increases, the cell output is likely to decrease.

The cooling operation is performed by controlling the flow rate controller 206 and the pressure controller 207 as described above to supply the anode liquid from the liquid tank 201 to the cooling flow path such as the cooling flow path 141 through the anode inflow path $IN_A$. At this time, the cell output can be restored by controlling the temperature of the electrolysis cell by adjusting supply time and the flow rate. The temperature of the electrolysis cell can be measured, for example, by using a temperature sensor connected to a point to be measured.

The necessity of the above cooling operation can be determined by not only changes in the cell voltage, cell current, and cell temperature of the electrolysis cell, but also performance of the gas-liquid separation between the anode 111 and cathode 121, that is, an amount of liquid and gas movement between the anode 111 and cathode 121, an amount of gas in the product, a difference between the cell voltage and a potential of the reference electrode 204, and estimated values of parameter-based Faradaic efficiency. It can also be determined comprehensively from each parameter, and a combination of each value and a calculation method can be arbitrary.

When a current density of the electrolysis cell is low and electrolysis efficiency is high, a heating value is small, and in-plane uniformity of the temperature of the electrolysis cell can be maintained by supplying the anode liquid from the liquid tank 201 to the cooling flow path such as the cooling flow path 141. On the other hand, when the current density of the cell is high and the electrolysis efficiency is low, the heating value is large, and it is necessary to maintain the in-plane uniformity of the temperature of the electrolysis cell by circulating the anode liquid supplied to the cooling flow path such as the cooling flow path 141, so it is simple and preferable to determine the necessity for the cooling operation according to the current density and electrolysis efficiency of the electrolysis cell.

The necessity for the cooling operation may be determined by considering operating time of the electrolysis cell. The operating time can be calculated by estimating or predicting a temperature rise rate according to a heat release amount of the electrolysis cell and a heat release amount by the temperature rise of the anode liquid. Therefore, it is preferable to control the temperature of the anode liquid according to the predicted future operation of the electrolysis cell. It is also possible to use calculated values such as a product of an integrated voltage value and time, a current value and time, and the like, and a combination thereof and calculation method can be arbitrary. Determination based on the calculated values of these combinations is preferred to determination simply based on duration, since differences in an operation method of the electrolysis cell are taken into account. Further, variations in current and voltage, a pH value of the anode liquid, a change value, an oxygen generation amount, and a variation amount may be used to determine the necessity for the cooling operation.

The anode liquid preferably has electric conductivity of at least 10 mS/m or more, and more preferably 100 mS/m or more. This can achieve an effect of reducing internal resistance of the electrolysis cell and increasing thermal conductivity. Considering the cooling performance, it is preferable to use an electrolytic solution with the higher thermal conductivity than that of water as the anode liquid. The high thermal conductivity allows the heat of the electrolysis cell to be transferred efficiently to the electrolytic solution for cooling the electrolysis cell. Cooling is important in the carbon dioxide reduction reaction because the electrolysis efficiency is low and the heating value is large. The electrolysis efficiency is defined here as a theoretical voltage/reaction voltage.

A freezing point of the anode liquid can be lowered to 0° C. or less because the anode liquid contains ions. This makes it easier to use in cold regions, for example, because the anode liquid does not freeze even in environment of 0° C. or less. Besides, the freezing of the inside of the electrolysis cell will cause physical destruction or the like of cell members. For example, the inside of the anode flow path 112 and the inside of the cooling flow path such as the cooling flow path 141 may freeze and expand in volume, destroying screws and other parts that hold down a clamping plate. Further, once the volume expands, a clamping pressure may change, as the clamping pressure has a significant effect on the electrolysis cell performance. This may cause distortion of the clamping plates, distortion of the screws, distortion of the flow path plates, and the like. Further, the separator 131 may break down due to swelling, stretching, and so on, and ion exchange performance of the electrolyte may be reduced. The performance of the gas diffusion layer and the cathode catalyst layer may be reduced by cracking due to freezing.

As described above, the carbon dioxide electrolytic device of this embodiment includes the cooling flow path connected in parallel to the anode flow path, and by supplying the anode liquid to both the anode flow path and the cooling flow path, the increase in temperature cell of the electrolysis cell due to the electrolysis operation can be suppressed and the decrease in electrolysis efficiency can be suppressed.

All of unused energy from the electrolysis operation is released to the outside as heat. Particularly in stacks containing multiple electrolysis cells, reaction volume density is high, making cooling even more important. Besides, since reaction properties of the carbon dioxide electrolytic reaction vary greatly depending on the temperature, the temperature in-plane uniformity of the electrolysis cells and the temperature distribution of the electrolysis cells in the stack with multiple electrolysis cells can greatly reduce the electrolysis efficiency, so cooling performance and temperature distribution uniformity by the cooling method are effective in improving efficiency.

However, when the operating load is high (high reaction current density), the electrolysis efficiency is low and the heating value is large, while when the operating load is small (low reaction current density), the electrolysis efficiency is high and the heating value is small. To maintain the uniform cell temperature under these different operating conditions, multiple cooling flow paths can be installed, but this is not desirable because of complexity of valves and the flow paths, increase in volume of the cooling flow path plates, complexity of a system, increase in cost, and the like. Therefore, when the operating load is small (small reaction current density), the anode liquid is cooled and circulated to perform the cooling operation in each electrolysis cell with a nearly common structure, or with a structure that is nearly equivalent in the pressure loss or the like (preferably with a pressure loss difference of ±50%), and when the operating load is large (high reaction current density) (voltage applied to a single cell is large), a dedicated cooling flow path is used to keep a temperature difference in each cell to a minimum by varying the cooling liquid flow rate in each cell or in each cooling flow path with different channel structures and pressure losses.

The different flow path structure for each cooling flow path, for example, when the heating value per unit volume is the same, the temperature of the cooling flow path at the end portion is relatively low due to the heat release effect of the clamping plate, or the like, while the temperature rise is large in the electrolysis cell at the center portion, so more cooling is needed. Therefore, the cooling flow path at the center portion has a flow path structure with low pressure loss. Concretely, a width and depth of the flow path are widened or deepened, and in the case of a parallel flow path structure, the number of parallel flow paths is increased, and the like.

Although there is a method of keeping the cell temperature uniform by changing the flow rate of the anode liquid, it is not desirable because when the flow rate of the anode liquid changes, the cell output changes, and if gas components such as oxygen gas generated by the reaction in the anode liquid exists in the flow path, it forms a gas-liquid two-layer flow, which causes the pressure loss, and it is difficult to control in flow paths with different flow path structures and pressure losses, and the property change of the reaction caused by the difference in flow rate is large.

When the operating load is small (small current per unit area/small voltage applied to a single cell), the heating value in the electrolysis cells is small, and cooling by the electrolytic solution alone is sufficient. When cooling can be provided by the heat release amount from an external surface of the stack of the electrolysis cell itself, and a liquid amount of the electrolytic solution and a heat capacity of peripheral equipment, the method without cooling the anode liquid itself is preferable. Besides, at an intermediate operating load, a temperature difference of each cell is kept to the minimum by distributing the anode liquid in the cooling flow path and allowing the cooled electrolytic solution to flow through both the cooling flow path and the anode flow path. At this time, it is preferable to change the ratio of the flow rates of the cooling flow path and the anode flow path because the temperature difference of each cell can be kept to the minimum even if the operating load changes. For this purpose, the flow rate ratio between the cooling flow path and the anode flow path is changed to be adjusted by the flow rate controller 205 and the flow rate controller 206 according to the temperature of each electrolysis cell and the operating load. Further, by measuring the temperature of the electrolysis cell with a sensor that acquires the temperature of each electrolysis cell and changing the ratio of the flow rate of the cooling flow path and the anode flow path according to the measured temperature data, there is no need to provide a cooler in each of the anode flow path and the cooling flow path, and a single cooler can be connected to each of the anode flow path and the cooling flow path, and thereby, the system can be simplified and lowered in cost.

This embodiment can be combined with other embodiments as appropriate.

Second Embodiment

Figure 8:
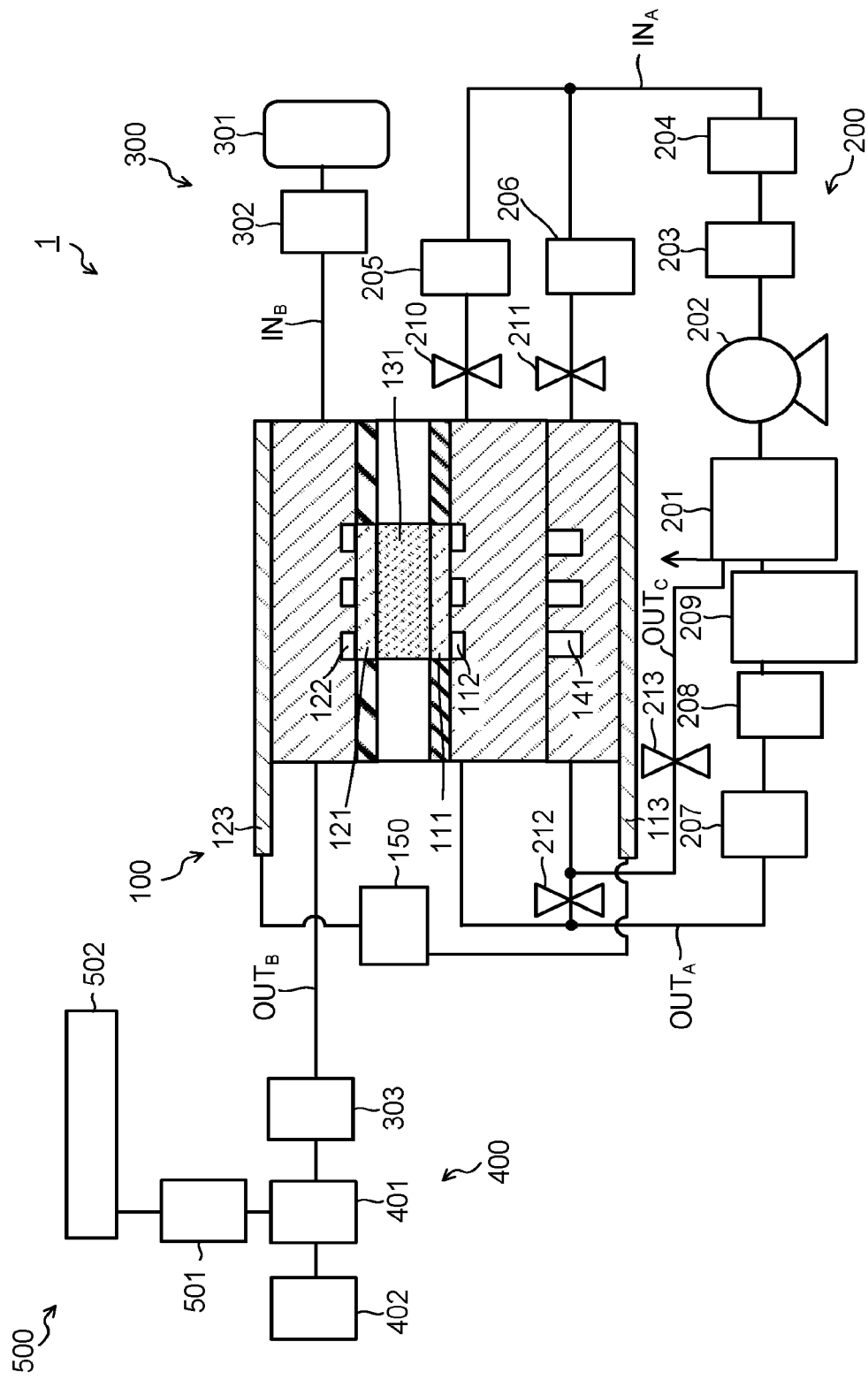
FIG. 8 is a schematic diagram to explain another configuration example of the carbon dioxide electrolytic device.

FIG. 8 is a schematic diagram to explain another configuration example of the carbon dioxide electrolytic device. The carbon dioxide electrolytic device illustrated in FIG. 8 differs from the carbon dioxide electrolytic device 1 illustrated in FIG. 1 in having a valve 210, a valve 211, a valve 212, and a valve 213. The description of the first embodiment is used accordingly for the other parts.

The valve 210 is provided in a middle of the anode inflow path $IN_A$. The valve 210 can connect the inlet IN of the anode flow path 112 and the outlet OUT of the liquid tank 201 through the anode inflow path $IN_A$.

The valve 211 is provided in a middle of the anode inflow path $IN_A$. The valve 211 can connect the inlet IN of the cooling flow path such as the cooling flow path 141 and the outlet OUT of the liquid tank 201 through the anode inflow path $IN_A$.

The valve 212 is provided in a middle of the anode outflow path $OUT_A$. The valve 212 can connect the outlet OUT of the anode flow path 112 and the inlet IN of the liquid tank 201 through the anode outflow path $OUT_A$.

The valve 213 is provided in a middle of a second anode outflow path $OUT_C$. The second anode outflow path $OUT_C$ connects the anode outflow path $OUT_A$ and a second inlet IN2 of the liquid tank 201. The valve 213 can connect the outlet OUT of the cooling flow path such as the cooling flow path 141 and the second inlet IN2 of the liquid tank 201 through the second anode outflow path $OUT_C$.

Opening and closing of the valves 210 to 213 are preferably controlled by the controller 502, for example, according to the voltage or current between the anode 111 and the cathode 121. Since properties of the reaction are likely to vary depending on the temperature and flow rate of the anode liquid, it is not preferable to change conditions of the anode liquid. For this reason, when the properties are given priority, the operation is preferably performed by connecting the inlet IN of the anode flow path 112 and the outlet OUT of the liquid tank 201 by the valve 210, connecting the inlet IN of the cooling flow path such as the cooling flow path 141 and the outlet OUT of the liquid tank 201 by the valve 211, disconnecting the connection between the outlet OUT of the anode flow path 112 and the inlet IN of the liquid tank 201 by the valve 212, and connecting the outlet OUT of the cooling flow path such as the cooling flow path 141 and the second inlet IN2 of the liquid tank 201 by the valve 213.

On the other hand, when system efficiency is given priority, the cooling operation may be performed by connecting the inlet IN of the anode flow path 112 and the outlet OUT of the liquid tank 201 by the valve 210, connecting the inlet IN of the cooling flow path such as the cooling flow path 141 and the outlet OUT of the liquid tank 201 by the valve 211, connecting the outlet OUT of the anode flow path 112 and the inlet IN of the liquid tank 201 by the valve 212, and disconnecting the connection between the outlet OUT of the cooling flow path such as the cooling flow path 141 and the second inlet IN2 of the liquid tank 201 by the valve 213. When it is desired to operate with cooling as an important factor due to outside temperature or other factors, the cooling operation is preferably performed by connecting the inlet IN of the anode flow path 112 and the outlet OUT of the liquid tank 201 by the valve 210, connecting the inlet IN of the cooling flow path such as the cooling flow path 141 and the outlet OUT of the liquid tank 201 by the valve 211, disconnecting the connection between the outlet OUT of the anode flow path 112 and the inlet IN of the liquid tank 201 by the valve 212, and connecting the outlet OUT of the cooling flow path such as the cooling flow path 141 and the second inlet IN2 of the liquid tank 201 by the valve 213.

As described above, in the carbon dioxide electrolytic device of this embodiment, a degree of freedom of the cooling operation can be increased by controlling the supply of the anode liquid to the anode flow path 112 and the cooling flow path such as the cooling flow path 141 by using a plurality of valves. Thus, the decrease in electrolysis efficiency can be suppressed.

This embodiment can be combined with other embodiments as appropriate.

Third Embodiment

Figure 9:
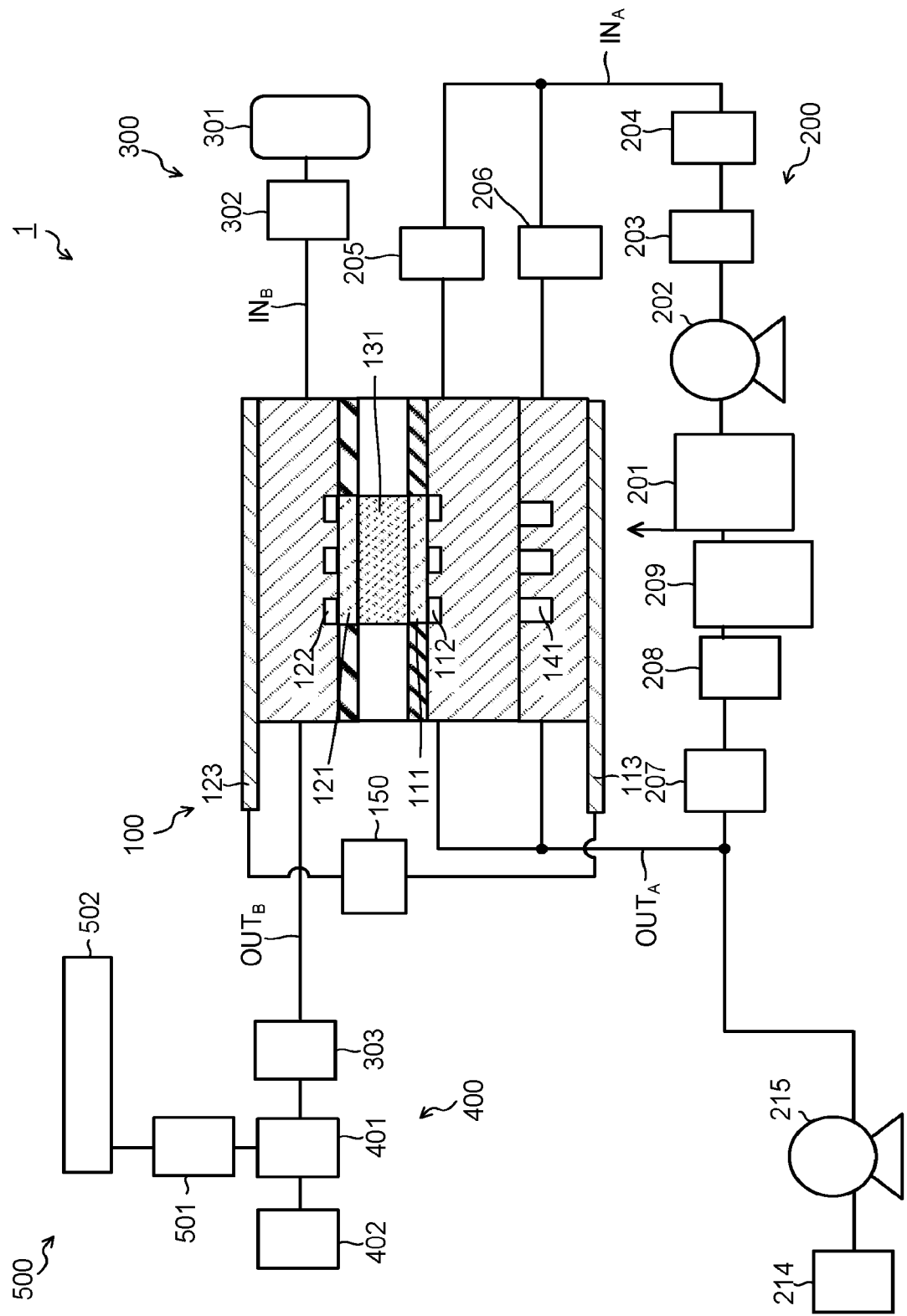
FIG. 9 is a schematic diagram to explain still another configuration example of the carbon dioxide electrolytic device.

FIG. 9 is a schematic diagram to explain another configuration example of the carbon dioxide electrolytic device. The carbon dioxide electrolytic device illustrated in FIG. 9 differs from the carbon dioxide electrolytic device 1 illustrated in FIG. 1 in having a liquid tank 214 and a flow rate controller 215. The description of the first embodiment is used accordingly for the other parts.

An outlet OUT of the liquid tank 214 is connected to the anode outflow path $OUT_A$. The outlet OUT of the liquid tank 214 may be connected to the anode inflow path $IN_A$. The liquid tank 214 can store an electrolytic solution containing an electrolyte. A concentration of the electrolyte in the electrolytic solution is preferably higher than the concentration of the electrolyte in the anode liquid. An electrolytic solution containing ions applicable to the anode liquid can be used as the electrolytic solution.

The flow rate controller 215 is provided in a middle of the anode outflow path $OUT_A$. The flow rate controller 215 is controlled, for example, by the controller 502. The flow rate controller 215 has a pump, for example, and controls a flow rate of the anode liquid supplied from the liquid tank 214 to the anode outflow path $OUT_A$. When the outlet of the liquid tank 214 is connected to the anode inflow path $IN_A$, the flow rate controller 215 is provided in a middle of the anode outflow path $OUT_A$.

When the anode liquid containing the electrolytic solution flows into the anode flow path 112 to perform the electrolysis operation, cations move from the anode flow path 112 to the cathode flow path 122 and are discharged through the outlet of the cathode flow path 122. As a result, the anode liquid flowing through the anode flow path 112 has a reduced concentration of the electrolyte.

In contrast, the electrolytic device of this embodiment can suppress the decrease in the electrolyte concentration of the anode liquid by adding the anode liquid with the electrolytic solution from the liquid tank 214. For example, the decrease in the electrolyte concentration of the anode liquid flowing into the anode flow path 112 is detected by a pH sensor, ion sensor, and the like, or estimated from a coulomb amount of the electrolytic reaction, and the electrolytic solution is added accordingly. This allows the carbon dioxide electrolytic device to be operated continuously. The system efficiency can also be improved by using the anode liquid flowing through the cooling flow path such as the cooling flow path 141, which has a relatively large capacity, as a buffer liquid and adding the electrolytic solution from liquid tank 214, for example, when surplus power is abundant or when power charges are low.

This embodiment can be combined with other embodiments as appropriate.

Fourth Embodiment

Figure 10:
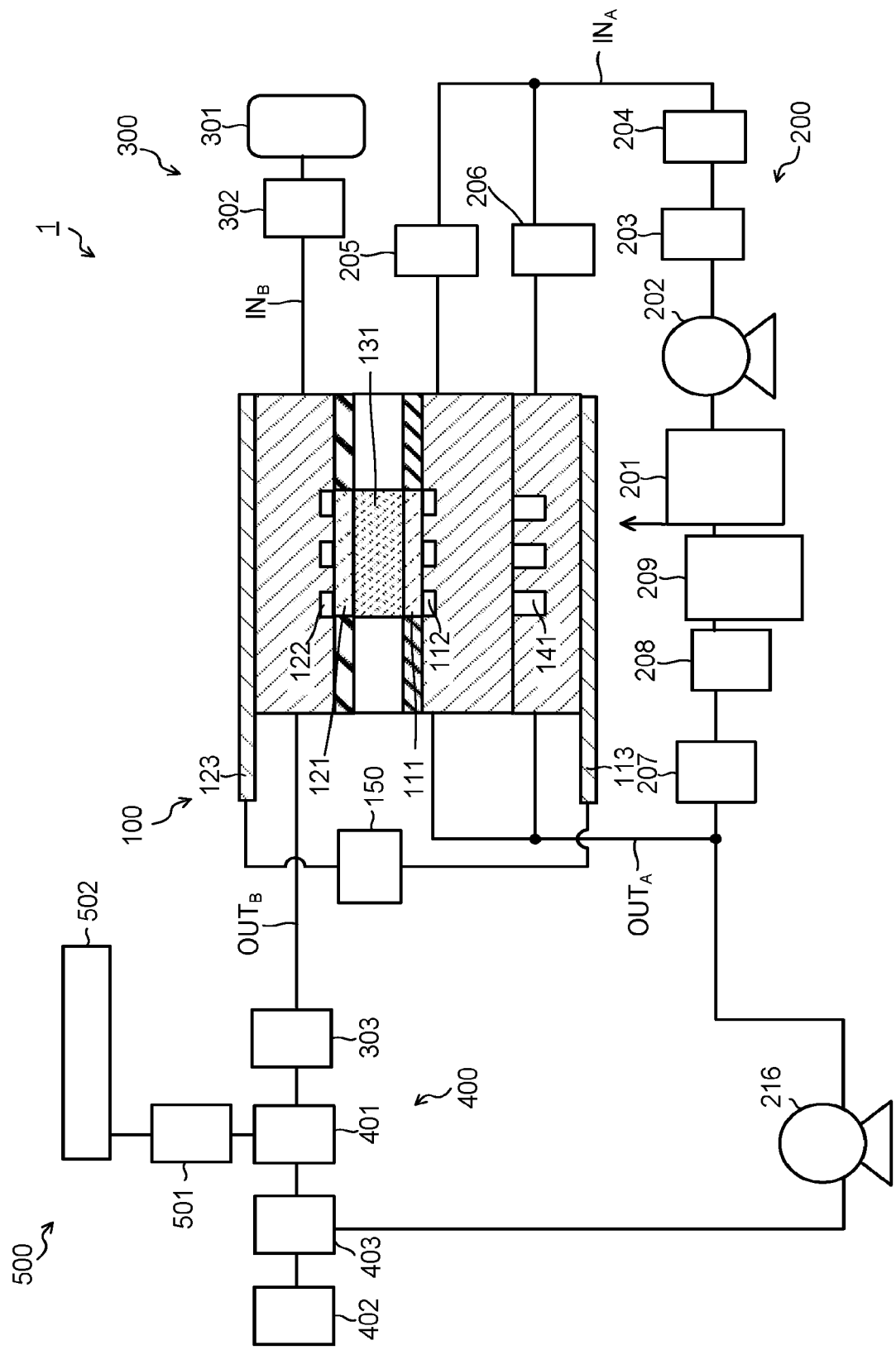
FIG. 10 is a schematic diagram to explain still another configuration example of the carbon dioxide electrolytic device.

FIG. 10 is a schematic diagram to explain another configuration example of the carbon dioxide electrolytic device. The carbon dioxide electrolytic device illustrated in FIG. 10 differs from the carbon dioxide electrolytic device 1 illustrated in FIG. 1 in having a flow rate controller 216 and a liquid tank 403. The description of the first embodiment is used accordingly for the other parts.

The flow rate controller 216 is connected to an outlet OUT of the liquid tank 403. The flow rate controller 216 is controlled, for example, by the controller 502. The flow rate controller 216 has a pump, for example, and can control a flow rate of a liquid supplied from the liquid tank 403 to the anode outflow path $OUT_A$.

An inlet IN of the liquid tank 403 is connected to the cathode outflow path $OUT_B$. The liquid tank 403 stores a liquid contained in a fluid flowing out of the cathode flow path 122.

When the anode liquid containing the electrolytic solution flows into the anode flow path 112 to perform the electrolysis operation, cations move from the anode flow path 112 to the cathode flow path 122 and are discharged through the outlet OUT of the cathode flow path 122. As a result, the anode liquid flowing through the anode flow path 112 decreases in concentration of the electrolyte.

In contrast, in the electrolytic device of this embodiment, the decrease in the electrolyte concentration of the anode liquid can be suppressed by returning the liquid contained in the fluid flowing out of the cathode flow path 122 to the anode outflow path $OUT_A$. For example, the decrease in the electrolyte concentration of the anode liquid flowing into the anode flow path 112 is detected by a pH sensor, ion sensor, or the like, or estimated from a coulomb amount of the electrolytic reaction, and the liquid contained in the fluid flowing out of the cathode flow path 122 is returned to the anode outflow path $OUT_A$ according to the result. This allows the carbon dioxide electrolytic device 1 to be operated continuously.

This embodiment can be combined with other embodiments as appropriate.

Fifth Embodiment

Figure 11:
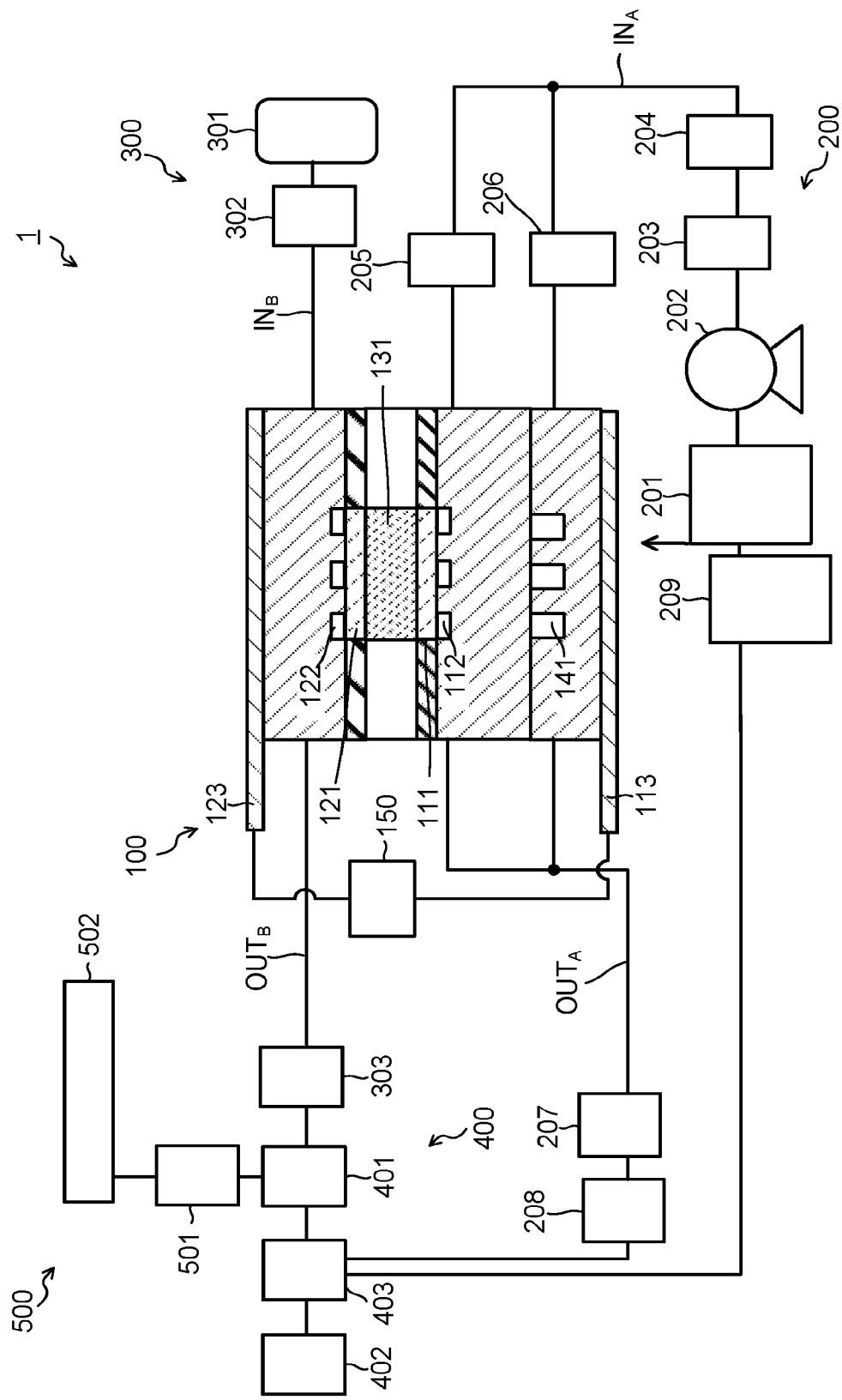
FIG. 11 is a schematic diagram to explain still another configuration example of the carbon dioxide electrolytic device.

FIG. 11 is a schematic diagram to explain another configuration example of the carbon dioxide electrolytic device. The carbon dioxide electrolytic device illustrated in FIG. 11 differs from the carbon dioxide electrolytic device illustrated in FIG. 1 in having the liquid tank 403 and in connection points of the pressure controller 207 and the cooler 208. The description of the first embodiment is used accordingly for the other parts.

A first inlet IN1 of the liquid tank 403 is connected to the cathode outflow path $OUT_B$. A second inlet IN2 of the liquid tank 403 is connected to the outlet OUT of the anode flow path 112 through the anode outflow path $OUT_A$, the pressure controller 207, and the cooler 208. An outlet OUT of the liquid tank 403 is connected to the inlet of the liquid tank 201 through the anode outflow path $OUT_A$ and the solution separator 209. The liquid tank 403 stores a liquid contained in a fluid flowing out of the cathode flow path 122.

The fluid flowing out of the cathode flow path 122 may contain warmed water vapor gas, for example, which may interfere with utilization of reduction products. For example, it may interfere with the reaction of carbon dioxide reduction to produce carbon monoxide and the reaction of carbon monoxide with hydrogen to produce hydrocarbon. Besides, a large amount of water vapor may cause water to be lost from a reaction system, and an amount of water required may greatly exceed a theoretical amount of water needed in the reaction. Water is one of resources, and the amount of water used in the reaction is preferably a minimum required.

When another reaction device is connected to a subsequent stage of the carbon dioxide electrolytic device 1, the water vapor may dilute reaction gas and reduce reaction efficiency of the reaction device at the subsequent stage. When a chemical reaction in the reaction device at the subsequent stage is a high temperature reaction, the water vapor must also be heated, resulting in a large loss. Therefore, it is preferable to cool the water vapor once and recover it as water. By using the same liquid as the anode liquid for this cooling, the number of pumps and valves in the system can be reduced, making it more efficient and less expensive.

Heat exchange between the liquid and the gaseous carbon dioxide may be done. In this case, a separate mechanism is required to return the liquid flowing out of the cathode flow path 122 to the anode flow path 112 to prevent the decrease in the electrolyte concentration. In order to return the liquid contained in the fluid flowing out of the cathode flow path 122 to the anode flow path 112, the liquid directly cools the gas in the cathode flow path 122 and the liquid flowing out of the cathode flow path 122 is returned to the anode flow path 112. This is very efficient because the cooling of the gas in the cathode flow path 122 and the return of the liquid flowing out of the cathode flow path 122 to the anode outflow path $OUT_A$ can be performed in common. The heat exchange does not necessarily have to be done, and the cooler 208 may be connected to the solution separator 209 as in the carbon dioxide electrolytic device illustrated in FIG. 1.

This embodiment can be combined with other embodiments as appropriate.

Sixth Embodiment

Figure 12:
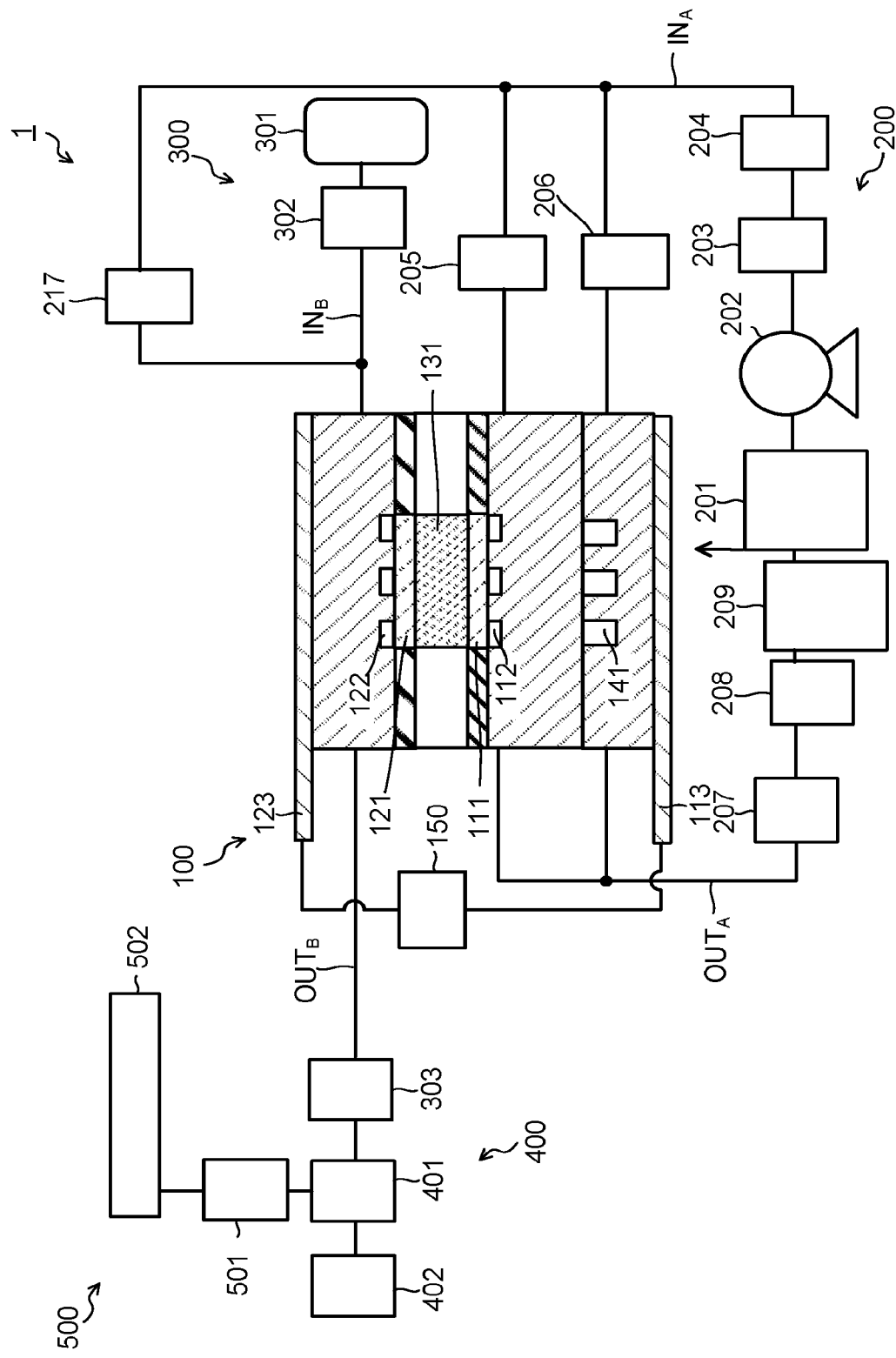
FIG. 12 is a schematic diagram to explain yet another configuration example of the carbon dioxide electrolytic device.

FIG. 12 is a schematic diagram to explain still another configuration example of the carbon dioxide electrolytic device. The carbon dioxide electrolytic device illustrated in FIG. 12 differs from the carbon dioxide electrolytic device 1 illustrated in FIG. 1 in having a flow rate controller 217. The description of the first embodiment is used accordingly for the other parts.

The flow rate controller 217 connects the anode inflow path $IN_A$ to the cathode inflow path $IN_B$. The flow rate controller 217 is controlled, for example, by the controller 502. The flow rate controller 217 has a pump, for example, and controls a flow rate of a liquid flowing into the cathode flow path 122 through the cathode inflow path $IN_B$.

The electrolytic solution flowing into the cathode flow path 122 from the anode 111 side may react with carbon dioxide gas to precipitate salt. The salt may, for example, block the cathode flow path 122 and reduce the reaction efficiency. Therefore, if necessary, an anode fluid containing the electrolytic solution is flowed in through the inlet IN of the cathode flow path 122 through the flow rate controller 217 to dissolve and discharge the salt. The use of the anode liquid flowing into the cooling flow path such as the cooling flow path 141 can simplify the system and reduce the number of auxiliaries, thus reducing the manufacturing cost. Although an elution capacity of anode salt is inferior to that of pure water, the use of the electrolytic solution is sufficient. An inflow timing of the anode liquid into the cathode flow path 122 can be at regular intervals or at the time when a blockage of the inflow path occurs or before the blockage occurs by checking the pressure or the like to know the blockage of the flow path or a sign thereof by using parameters used for the determination of the necessity of the cooling operation.

This embodiment can be combined with other embodiments as appropriate.

EXAMPLE

Example 1

The carbon dioxide electrolytic device illustrated in FIG. 1 was assembled to investigate carbon dioxide electrolysis performance. First, a cathode, in which carbon particles supporting gold nanoparticles were coated on carbon paper provided with a porous layer, was prepared by the following procedure. A coating solution was prepared by mixing carbon particles supporting gold nanoparticles with pure water, a Nafion solution, and ethylene glycol. An average particle diameter of the gold nanoparticles was 8.7 nm, and a supporting amount was 18.9 mass %. The coating solution was filled into an airbrush and spray-coated onto the carbon paper provided with the porous layer by using nitrogen gas. After the coating, the resultant was washed under running water with pure water for 30 minutes, and then immersed in a hydrogen peroxide solution to oxidize and remove organic substances such as ethylene glycol. The resultant was cut out to a size of 2×2 cm to be used as the cathode. A coating amount of gold was estimated to be about 0.4 mg/cm$^2$ based on an amount of gold nanoparticles and carbon particles mixed in the coating solution. For an anode, an electrode where $IrO_2$ nanoparticles as catalyst was coated on Ti mesh was used. The $IrO_2$/Ti mesh cut out to 2×2 cm was used as the anode.

An electrolytic reaction unit carried out a reaction by forming cooling flow paths at a stack of 10 electrolysis cells with a catalyst area of the cell of 100 cm$^2$ and current densities of 50, 100, and 400 mA/cm$^2$. A thickness of one electrolysis cell is 2 mm. A thickness of a flow path plate with the cooling flow path is 6 mm. A depth of an anode flow path is 1.0 mm. A depth of the cooling flow path is 5 mm.

A clamping plate was not provided with the cooling flow path, and the clamping plate, an insulating plate, a 1 mm current collector plate, a stack of a flow path plate with the cooling flow path and the electrolysis cell, a 1 mm current collector plate, an insulating plate, and a clamping plate were stacked in this order.

The carbon dioxide electrolytic device was assembled using the electrolytic reaction unit described above, and operated under the following conditions. Carbon dioxide gas was supplied to a cathode flow path at 500 sccm per one electrolysis cell, and a potassium hydrogen carbonate solution (concentration of 1M $KHCO_3$), an electrolytic solution, was flowed into the anode flow path at a flow rate of 10 ccm per one electrolysis cell.

The current densities were set at 50 mA/cm$^2$, 100 mA/cm$^2$, and 400 mA/cm$^2$. At 50 mA/cm$^2$, the reaction was carried out by passing the electrolytic solution cooled to 25° C. and passing the electrolytic solution cooled to 25° C. through the cooling flow path at a flow rate of 2.5 ccm/cell. At 100 mA/cm$^2$, the reaction was carried out by passing the electrolytic solution cooled to 25° C. and passing the electrolytic solution cooled to 25° C. through the cooling flow path at a flow rate of 10 ccm/cell. At 400 mA/cm$^2$, the reaction was carried out by passing the electrolytic solution cooled to 25° C. and passing the electrolytic solution cooled to 25° C. through the cooling flow path at a flow rate of 50 ccm/cell.

All cell voltages during the reaction were collected by a control unit. A part of the gas flowing out of the cathode flow path was collected and an amount of carbon monoxide or hydrogen gas produced by a carbon dioxide reduction reaction or water reduction reaction was analyzed by a gas chromatograph incorporated into a cell performance detector. Partial current densities of carbon monoxide and hydrogen and Faradaic efficiency, which is a ratio of a total current density to the partial current density, were collected from the gas production amounts by the control unit. The results are presented in Table 1. Table 1 presents a cell voltage, cell resistance, Faradaic efficiency of carbon monoxide, and Faradaic efficiency of hydrogen.

Comparative Example 1

Regardless of the current density of 50 mA/cm$^2$, 100 mA/cm$^2$, or 400 mA/cm$^2$, the reaction was carried out by passing the electrolytic solution cooled to 25° C. and without any flow in the cooling flow path. Otherwise, the reaction was carried out in the same manner as in Example 1. The results are presented in Table 1.

Example 2

The reaction was carried out in the same manner as in Example 1, except that a flow path depth of the cooling flow path was set to 2.5 mm in the electrolysis cell at an end portion, and 4 mm in a second electrolysis cell from the end portion. The results are presented in Table 1.

Example 3

Regardless of the current density of 50 mA/cm$^2$, 100 mA/cm$^2$, or 400 mA/cm$^2$, the reaction was carried out by passing an electrolytic solution cooled to 25° C. and passing the electrolytic solution cooled to 25° C. through the cooling flow path at a flow rate of 25 ccm/cell. Otherwise, the reaction was carried out in the same manner as in Example 1. The results are presented in Table 1.

Example 4

The electrolytic solution was flowed in 0.5 cc every 4 hours through an inlet of the cathode flow path. Otherwise, the reaction was carried out in the same manner as in Example 1. The results are presented in Table 1.

Comparing each example with Comparative Example 1, it can be seen that the variation of each cell voltage in each example is small, the voltage is low, and the electrolysis efficiency is high. It can also be seen that the Faradaic efficiency of carbon monoxide, which is an indicator of carbon dioxide reduction selectivity, is high. Furthermore, values immediately after operation for up to 504 hours and then stopping show that a suppression effect of decrease in the electrolysis efficiency is significant when the device is operated for a long time.

In all of the examples, an average value of each cell voltage in the stack of multiple electrolysis cells decreased, and the variation of the cell voltage decreased. Further, the Faradaic efficiency of carbon monoxide was improved due to the lower voltage, which resulted in lower a hydrogen production amount in a side reaction and a more progressive carbon dioxide reduction reaction. The decrease in the cell voltage leads to increase in cell lifetime. Besides, the decrease in the cell voltage improves the electrolysis efficiency and suppresses the heating value, resulting in a smaller variation in the temperature of the electrolysis cell.

Further, since an area of a hot portion of the electrolysis cell decreases during the electrolysis operation, a water content of a separator increases at high temperature, improving ion exchange properties of the separator and decreasing a cell resistance. This decrease in the cell resistance further reduces the heating value.

TABLE 1

| | | | Example 1 | Example 2 | Example 3 | Example 4 | Comparative example 1 |
|---|---|---|---|---|---|---|---|
| 50 mA/cm$^2$ | Initial value | Voltage (V) | 2.75 ± 0.07 | 2.73 ± 0.04 | 2.73 ± 0.05 | 2.75 ± 0.08 | 2.82 ± 0.12 |
| | | Cell resistance (mΩ) | 270 | 270 | 270 | 270 | 272 |
| | | F.E.(CO) | 95.4 | 96.5 | 95.8 | 95.4 | 95 |
| | | F.E.($H_2$) | 3.2 | 2.8 | 3 | 3.2 | 3.8 |
| | After 504 h | Voltage (V) | 2.97 ± 0.15 | 2.79 ± 0.07 | 2.88 ± 0.12 | 2.75 ± 0.06 | 3.01 ± 0.17 |
| | | Cell resistance (mΩ) | 320 | 315 | 318 | 320 | 340 |
| | | F.E.(CO) | 3.2 | 95.1 | 94.8 | 95.3 | 89.5 |
| | | F.E.($H_2$) | 5.1 | 3.8 | 4.6 | 3.2 | 7.6 |
| 100 mA/cm$^2$ | Initial value | Voltage (V) | 2.98 ± 0.10 | 2.96 ± 0.07 | 2.97 ± 0.06 | 2.97 ± 0.09 | 3.06 ± 0.19 |
| | | Cell resistance (mΩ) | 262 | 262 | 262 | 262 | 276 |
| | | F.E.(CO) | 94.3 | 94.7 | 94.5 | 94.3 | 90.1 |
| | | F.E.($H_2$) | 3.8 | 3.2 | 3.5 | 3.8 | 8.7 |
| | After 504 h | Voltage (V) | 3.15 ± 0.20 | 3.13 ± 0.18 | 3.13 ± 0.20 | 3.01 ± 0.11 | 3.21 ± 0.25 |
| | | Cell resistance (mΩ) | 267 | 267 | 267 | 267 | 292 |
| | | F.E.(CO) | 93 | 94.5 | 93.9 | 94.5 | 85.3 |
| | | F.E.($H_2$) | 4.7 | 3.9 | 4.2 | 3.8 | 12 |
| 400 mA/cm$^2$ | Initial value | Voltage (V) | 3.18 ± 0.12 | 3.14 ± 0.09 | 3.16 ± 0.10 | 3.16 ± 0.11 | 3.40 ± 0.27 |
| | | Cell resistance (mΩ) | 261 | 261 | 261 | 261 | 276 |
| | | F.E.(CO) | 94.1 | 94.4 | 94.2 | 94.2 | 85.3 |
| | | F.E.($H_2$) | 4.0 | 3.8 | 3.9 | 3.9 | 13.4 |
| | After 504 h | Voltage (V) | 3.42 ± 0.23 | 3.38 ± 0.17 | 3.41 ± 0.20 | 3.42 ± 0.23 | 3.60 ± 0.41 |
| | | Cell resistance (mΩ) | 263 | 263 | 263 | 263 | 288 |
| | | F.E.(CO) | 91.1 | 93.2 | 92.2 | 93.6 | 73.9 |
| | | F.E.($H_2$) | 7.1 | 5.9 | 6.7 | 5.7 | 20.7 |

Note that the above-described configurations in the embodiments are applicable in combination, and parts thereof are also replaceable. While certain embodiments have been described, these embodiments have been presented by way of example only, and are not intended to limit the scope of the inventions. Indeed, those embodiments may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A carbon dioxide electrolytic device, comprising:
an electrolysis cell including
an anode configured to oxidize water and thus form oxygen,
an anode flow path facing the anode,
a cathode configured to reduce carbon dioxide and thus form a carbon compound,
a cathode flow path facing the cathode, and
a separator between the anode and the cathode;
a cooling flow path provided opposite to the anode flow path or the cathode flow path and connected in parallel to the anode flow path to form a connection therebetween;
an anode inflow path connecting an inlet of the anode flow path, an inlet of the cooling flow path, and an outlet of a liquid tank configured to store a liquid containing water and an electrolyte;
an anode outflow path connecting an outlet of the anode flow path, an outlet of the cooling flow path, and an inlet of the liquid tank;
a cooler configured to cool the anode outflow path;
a cathode inflow path configured to connect an inlet of the cathode flow path and an outlet of a gas tank configured to store gas containing carbon dioxide; and
a cathode outflow path connected to an outlet of the cathode flow path,
wherein the connection is connected to the anode inflow path via the cooler,
wherein the cathode outflow path is further connected to an inlet of a third liquid tank configured to store a liquid in a fluid flowing from the cathode outflow path, and
wherein the anode outflow path is further connected to an outlet of the third liquid tank.

2. The device according to claim 1, further comprising a plurality of the electrolysis cells, wherein
the cooling flow path is provided between the anode flow path of one of the plurality of electrolysis cells and the cathode flow path of the another one of the plurality of electrolysis cells.

3. The device according to claim 1, further comprising:
a plurality of the electrolysis cells;
a plurality of the cooling flow paths;

an anode current collector connected to the anode of one of the plurality of electrolysis cells, and a cathode current collector connected to the cathode of one of the plurality of electrolysis cells, wherein one of the plurality of cooling flow paths is provided between the anode flow path of one of the plurality of electrolysis cells and the cathode flow path of another one of the electrolysis cells, and another one of the plurality of cooling flow paths is provided adjacent to the anode current collector or the cathode current collector.

4. The device according to claim 1, wherein thermal conductivity of the liquid is higher than thermal conductivity of the water.

5. The device according to claim 1, wherein a freezing point of the liquid is 0° C. or less.

6. The device according to claim 1, further comprising:
a first flow rate controller provided in a middle of the anode inflow path, and connecting the inlet of the anode flow path and the outlet of the liquid tank through the anode inflow path; and a second flow rate controller provided in a middle of the anode inflow path, and connecting the inlet of the cooling flow path and the outlet of the liquid tank through the anode inflow path.

7. The device according to claim 1, wherein
the inlet of the cooling flow path is closer to the outlet of the anode flow path than the inlet of the anode flow path, and the outlet of the cooling flow path is closer to the inlet of the anode flow path than the outlet of the anode flow path.

8. A carbon dioxide electrolytic device, comprising:
an electrolysis cell including
an anode configured to oxidize water and thus form oxygen, an anode flow path facing the anode, a cathode configured to reduce carbon dioxide and thus form a carbon compound, a cathode flow path facing the cathode, and a separator between the anode and the cathode:

a cooling flow path provided opposite to the anode flow path or the cathode flow path and connected in parallel to the anode flow path;

an anode inflow path connecting an inlet of the anode flow path, an inlet of the cooling flow path, and an outlet of a liquid tank configured to store a liquid containing water;

an anode outflow path connecting an outlet of the anode flow path, an outlet of the cooling flow path, and an inlet of the liquid tank;

a cooler configured to cool the anode outflow path;

a cathode inflow path configured to connect an inlet of the cathode flow path and an outlet of a gas tank configured to store gas containing carbon dioxide; and a cathode outflow path connected to an outlet of the cathode flow path, wherein the liquid contains an electrolyte, wherein the cathode outflow path is connected to an inlet of a third liquid tank configured to store a liquid in a fluid flowing from the cathode outflow path, and wherein the anode outflow path is connected to an outlet of the third liquid tank.

9. The device according to claim 8, further comprising
a plurality of the electrolysis cells, wherein
the cooling flow path is provided between the anode flow path of one of the plurality of electrolysis cells and the cathode flow path of the another one of the plurality of electrolysis cells.

10. The device according to claim 8, further comprising:
a plurality of the electrolysis cells;
a plurality of the cooling flow paths;
an anode current collector connected to the anode of one of the plurality of electrolysis cells, and a cathode current collector connected to the cathode of one of the plurality of electrolysis cells, wherein one of the plurality of cooling flow paths is provided between the anode flow path of one of the plurality of electrolysis cells and the cathode flow path of another one of the electrolysis cells, and another one of the plurality of cooling flow paths is provided adjacent to the anode current collector or the cathode current collector.

11. The device according to claim 8, wherein thermal conductivity of the liquid is higher than thermal conductivity of the water.

12. The device according to claim 8, wherein a freezing point of the liquid is 0° C. or less.

13. The device according to claim 8, further comprising:
a first flow rate controller provided in a middle of the anode inflow path, and connecting the inlet of the anode flow path and the outlet of the liquid tank through the anode inflow path; and a second flow rate controller provided in a middle of the anode inflow path, and connecting the inlet of the cooling flow path and the outlet of the liquid tank through the anode inflow path.

14. The device according to claim 8, wherein
the inlet of the cooling flow path is closer to the outlet of the anode flow path than the inlet of the anode flow path, and the outlet of the cooling flow path is closer to the inlet of the anode flow path than the outlet of the anode flow path.

15. The device according to claim 8, wherein a flow path width of a middle portion of the cooling flow path is larger than the flow path width of an end portion of the cooling flow path.

16. The device according to claim 8, wherein the cooling flow path is provided in a center portion of a surface of a flow path plate and is not provided in a peripheral portion surrounding the center portion.

17. The device according to claim 8, further comprising:
a first valve provided in a middle of the anode inflow path and configured to connect the inlet of the anode flow path and the outlet of the liquid tank through the anode inflow path;

a second valve provided in a middle of the anode inflow path and configured to connect the inlet of the cooling flow path and the outlet of the liquid tank through the anode inflow path;

a third valve provided in a middle of the anode outflow path and configured to connect the outlet of the anode flow path and a first inlet of the liquid tank through the anode outflow path;

a fourth valve provided in a middle of a second anode outflow path connecting the anode outflow path and a second inlet of the liquid tank, and configured to connect the outlet of the cooling flow path and the second inlet of the liquid tank through the second anode outflow path; and a controller programmed to control opening and closing of the first to fourth valves in accordance with on a voltage or current between the anode and the cathode.

18. The device according to claim 8, wherein
the liquid contains an electrolyte, and
the anode outflow path is connected to an outlet of a second liquid tank configured to store an electrolytic solution containing the electrolyte.

19. The device according to claim 8, wherein the connection is connected to the anode inflow path via the cooler and the liquid tank.

20. A carbon dioxide electrolytic device, comprising:
an electrolysis cell including
　an anode configured to oxidize water and thus form oxygen,
　an anode flow path facing the anode,
　a cathode configured to reduce carbon dioxide and thus form a carbon compound,
　a cathode flow path facing the cathode, and
　a separator between the anode and the cathode;
a cooling flow path provided opposite to the anode flow path or the cathode flow path and connected in parallel to the anode flow path;
an anode inflow path connecting an inlet of the anode flow path, an inlet of the cooling flow path, and an outlet of a liquid tank configured to store a liquid containing water;
an anode outflow path connecting an outlet of the anode flow path, an outlet of the cooling flow path, and an inlet of the liquid tank;
a cooler configured to cool the anode outflow path;
a cathode inflow path configured to connect an inlet of the cathode flow path and an outlet of a gas tank configured to store gas containing carbon dioxide; and
a cathode outflow path connected to an outlet of the cathode flow path,
wherein the liquid contains an electrolyte,
wherein the cathode outflow path is connected to a first inlet of a third liquid tank configured to store a liquid in a fluid flowing from the outlet of the cathode flow path,
wherein the anode outflow path is connected to a second inlet
wherein of the third liquid tank, and
wherein an outlet of the third liquid tank is connected to the inlet of the liquid tank.

* * * * *